US012784159B2

(12) United States Patent
Wheaton

(10) Patent No.: US 12,784,159 B2
(45) Date of Patent: Nov. 3, 2026

(54) METHOD, SYSTEM, AND COMPUTER PROGRAM PRODUCT PRODUCING A CORRECTED MAGNETIC RESONANCE IMAGE

(71) Applicant: CANON KABUSHIKI KAISHA, Tokyo (JP)

(72) Inventor: Andrew James Wheaton, Vernon Hills, IL (US)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 18/462,785

(22) Filed: Sep. 7, 2023

(65) Prior Publication Data

US 2025/0086761 A1 Mar. 13, 2025

(51) Int. Cl.
*G06T 5/80* (2024.01)
*G06T 7/32* (2017.01)

(52) U.S. Cl.
CPC .................. *G06T 5/80* (2024.01); *G06T 7/32* (2017.01); *G06T 2207/10016* (2013.01); *G06T 2207/10088* (2013.01)

(58) Field of Classification Search
CPC ... G06T 5/80; G06T 7/32; G06T 2207/10016; G06T 2207/10088; G01R 33/246; G01R 33/586; G01R 33/5659; G01R 33/5608
See application file for complete search history.

(56) References Cited

U.S. PATENT DOCUMENTS

| | | | | |
|---|---|---|---|---|
| 8,198,891 | B2 | 6/2012 | Sacolick et al. | |
| 9,977,106 | B2 | 5/2018 | Nehrke et al. | |
| 2014/0071156 | A1* | 3/2014 | Lee | G06T 7/0002 345/611 |

(Continued)

OTHER PUBLICATIONS

"Mihara , A method of RF inhomogeneity correction in MR imaging, 1998, Elsevier, Magnetic Resonance Materials in Physics, Biology and Medicine 7, pp. 115-120" (Year: 1998).*

(Continued)

*Primary Examiner* — Oneal R Mistry
*Assistant Examiner* — Justin Philip Cascais
(74) *Attorney, Agent, or Firm* — Maier & Maier, PLLC

(57) ABSTRACT

A method, system and computer program product for obtaining first and second sets of image data generated by performing a series of MRI sequences using first and second different transmit RF parameters; calculating a correlation map from the first and second sets of image data; and correcting the first set of image data using the calculated correlation map to obtain a corrected image. Also disclosed is a method, system and computer program product for determining at least two transmit RF parameters by: obtaining spatially-resolved B1 amplitude measurements; performing at least two spatially-resolved analyses on the obtained spatially-resolved B1 amplitude measurements to obtain at least two sub-sets of spatially-resolved B1 amplitude measurements; determining at least two transmit RF parameters to be used in a series of MRI sequences based on the obtained at least two sub-sets of spatially-resolved B1

(Continued)

amplitude measurements; and storing the at least two transmit RF parameters.

19 Claims, 22 Drawing Sheets
(4 of 22 Drawing Sheet(s) Filed in Color)

(56) References Cited

U.S. PATENT DOCUMENTS

| | | | | |
|---|---|---|---|---|
| 2018/0082432 | A1* | 3/2018 | Ishikawa | A61B 5/0077 |
| 2020/0049786 | A1 | 2/2020 | Venkatachari et al. | |

OTHER PUBLICATIONS

Cunningham, "Saturated Double-Angle Method for Rapid B1 Mapping", 2006, Magnetic Resonance in Medicine, 55, 1326-1333 (Year: 2006).*
Orzada, "RF Excitation Using Time Interleaved Acquisition of Modes (TIAMO) to Address B1 Inhomogeneity in High-Field MRI", 2010, Magnetic Resonance in Medicine, 64, 327-333 (Year: 2010).*
Partial Search Report issued on Jan. 31, 2025, in corresponding European Application No. 24194968.4, 19 pages.
Mihara et al., "A Method of RF Inhomogeneity Correction in MR Imaging", Magnetic Resonance Materials in Physics, Biology and Medicine, Elsevier Science B.V., ISSN: 1352-8661, XP002298584, Jan. 1, 1998, vol. 7, No. 2, 6 pages.
Extended Search Report issued on May 22, 2025, in corresponding European Application No. 24194968.4, 19 pages.
Belsley et al., "Optimal Flip Angles for in Vivo Liver 3DT1 Mapping and B1 + Mapping at 3T", Magnetic Resonance in Medicine, The Authors, XP072525409, May 1, 2023, vol. 90, No. 3, pp. 950-962.
Nehrke et al., "DREAM—A Novel Approach for Robust, Ultrafast, Multislice B1 Mapping", Magnetic Resonance in Medicine, 2012, 10 pages.
Insko et al., "Mapping of the Radiofrequency Field", Journal of Magnetic Resonance, Series A, vol. 103, Issue 1, Jun. 1, 1993, 4 pages.
Vasanawala et al., "Linear Combination Steady-State Free Precession MRI", Magnetic Resonance in Medicine, 2000, 9 pages.
Bangerter et al., "Analysis of Multiple-Acquisition SSFP", Magnetic Resonance in Medicine, 2004, 10 pages.
Yarnykh, "Actual Flip-Angle Imaging in the Pulsed Steady State: A Method for Rapid Three-Dimensional Mapping of the Transmitted Radiofrequency Field", Magnetic Resonance in Medicine, 2007, 9 pages.
Orzada et al., "RF Excitation Using Time Interleaved Acquisition of Modes (TIAMO) to Address B1 Inhomogeneity in High-Field MRI", Magnetic Resonance in Medicine, 2010, 7 Pages.
Sacolick et al., "B1 Mapping by Bloch-Siegert Shift", Magnetic Resonance in Medicine, 2010, 8 pages.
Orzada et al., "Time-Interleaved Acquisition of Modes: An Analysis of SAR and Image Contrast Implications", Magnetic Resonance in Medicine, 2012, 9 pages.
Foxall, "Frequency-Modulated Steady-State Free Precession Imaging", Magnetic Resonance in Medicine, 2002, 7 pages.

* cited by examiner

Background Art

305

620
615
605

610

B1 Map

Ratio Map

Conventional (RFL=1.00)

Composite

RFL1 = 0.80

RFL2 = 1.40

B1 Map

METHOD, SYSTEM, AND COMPUTER PROGRAM PRODUCT PRODUCING A CORRECTED MAGNETIC RESONANCE IMAGE

BACKGROUND OF THE INVENTION

Field of the Invention

This disclosure relates to a method, system, and computer program product for obtaining a corrected magnetic resonance imaging (MRI) image, and, in one embodiment, to a method, system, and computer product for obtaining a corrected MRI image by performing a series of MRI sequences using at least two RF different transmit RF parameters to obtain first and second sets of image data in a single MRI examination.

Discussion of the Background

When using MRI systems to perform imaging on a patient, a patient enters the gantry of an MRI system and is subjected to an examination including a series of scan sequences (shown in FIG. 1 as scan $sequence_1$ to scan $sequence_n$). Having finished the series of scan sequences in the patient exam, a patient exits the MRI system.

Known MRI systems perform an optional per-patient calibration to determine a reference RF transmitter gain level (RFL) prior to beginning an examination as shown in the optional pre-scan sequence 102 of FIG. 1. The RFL is calculated during a pre-scan process across the entirety of at least one slice of a set of 2D slices, thereby computing an RFL representative of the average of voxels within the slice. The reference RFL value subsequently is used to calculate the transmitter gain values to achieve the intended B1 amplitude for all subsequent RF pulses in the MR scan sequences. As would be appreciated by those skilled in the art, the B1 amplitude of the RF pulses has a direct relationship with the flip angle of the RF pulse, and the flip angle of the RF pulse is a primary determinant of MR signal intensity and image contrast. Thus, the RFL value has a known, and direct relationship, to B1 field and flip angle. By measuring the B1 field, the RFL can be directly and simply calculated. In general, if RFL is too low, there will be 'undertipping' which is a condition in which the data obtained is obtained when the flip angle is below expectation. By contrast, if RFL is too high, there will be 'overtipping' which is a condition in which the data obtained is obtained when the flip angle is above expectation. Both undertipping and overtipping can result in reduced image quality in the resulting MRI images (e.g., dark spots in an image).

However, even within an MRI image, B1 inhomogeneity (ΔB1) can result in image signal inhomogeneity. When the transmitter magnetic field is non-uniform, non-uniform flip angles and non-uniform signal variations can occur. This effect is pronounced at higher field strengths (e.g., 3T or higher) where B1 variation is greater due to dielectric effects. Variations in effective B1 levels result in darker or lighter regions in images as compared with regions of the image that had the target B1 level. In a conventional spin echo or fast spin echo image, the expected flip angle of the excitation pulse is $\pi/2$ and the expected flip angle of the refocusing pulse is R. For this example, darker regions in the image are caused by both undertipping or overtipping where the flip angles are less than or greater than the expected flip angles, respectively. Because the image signal in a conventional spin echo or fast spin echo is roughly proportional to $\sin^3((\pi/2)*(1+\Delta B1))$, an exemplary undertipping of −30% results in an inner term of ($1+\Delta B1=1-0.3=0.7$) and a signal$=\sin^3(0.7\pi/2)=0.71$, and an exemplary overtipping of +20% results in an inner term of ($1+\Delta B1=1+0.2=1.2$) and a signal$=\sin^3(1.2\pi/2)=0.86$. In the example of field echo imaging, the signal has a more complex relationship with flip angle and tissue T1 relaxation. Therefore, in field echo imaging, both darker (less signal) and lighter (more signal) regions may be produced due to flip angle variation caused by ΔB1.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete understanding of this disclosure is provided by reference to the following detailed description when considered in connection with the accompanying drawings, wherein.

DETAILED DESCRIPTION

Figure 1:
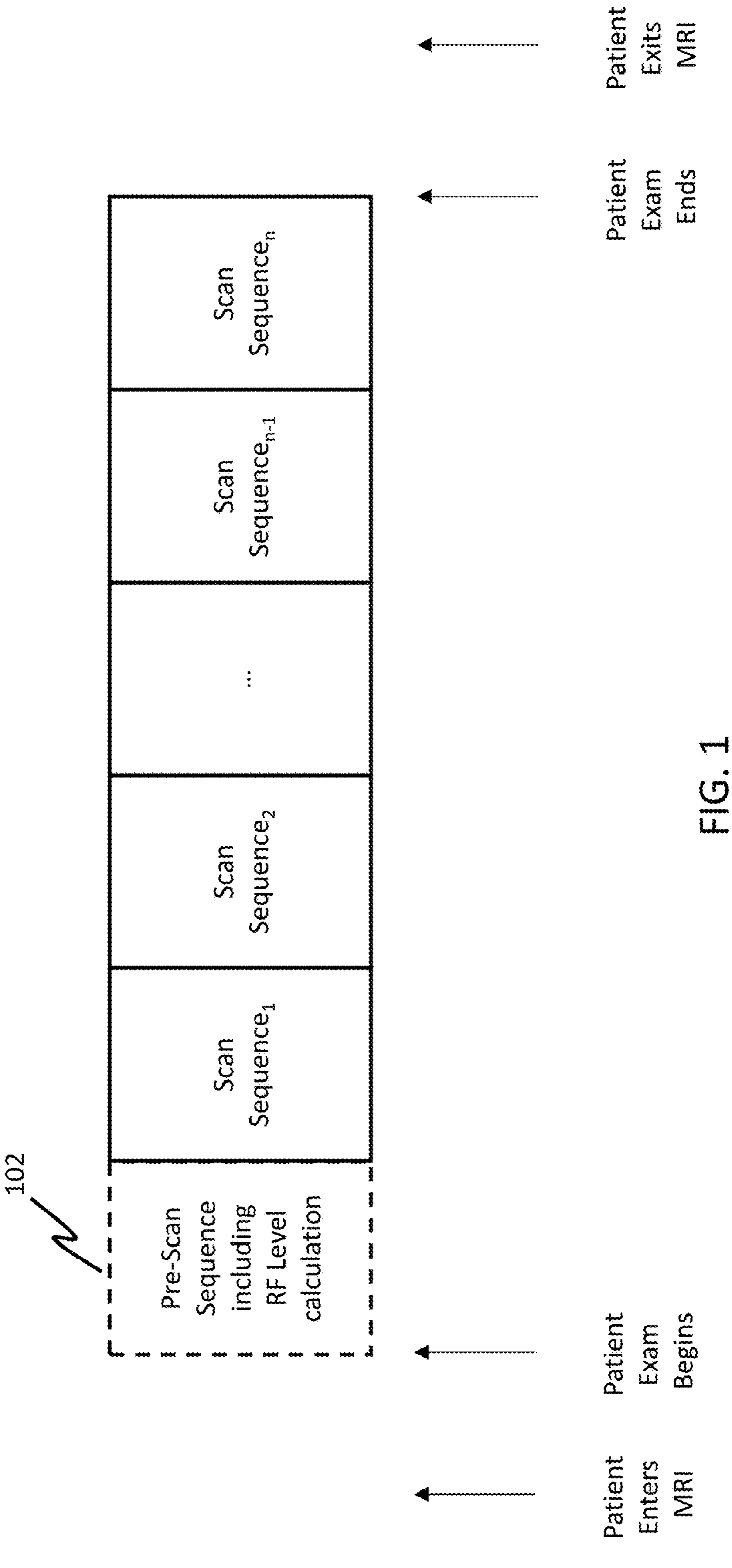
FIG. 1 illustrates a patient examination including an optional pre-scan and a series of scan sequences.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes, systems and computer program products provided in particular implementations. However, the processes, systems, and computer program products will operate effectively in other implementations. Phrases such as 'an embodiment', 'one embodiment', and 'another embodiment' can refer to the same or different embodiments. The embodiments will be described with respect to methods and compositions having certain components. However, the methods and compositions can include more or less components than those shown, and variations in the arrangement and type of the components can be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range—is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. Any definitions are intended to aid the reader in understanding the present disclosure, but are not intended to vary or otherwise limit the meaning of such terms unless specifically indicated.

Figure 2:
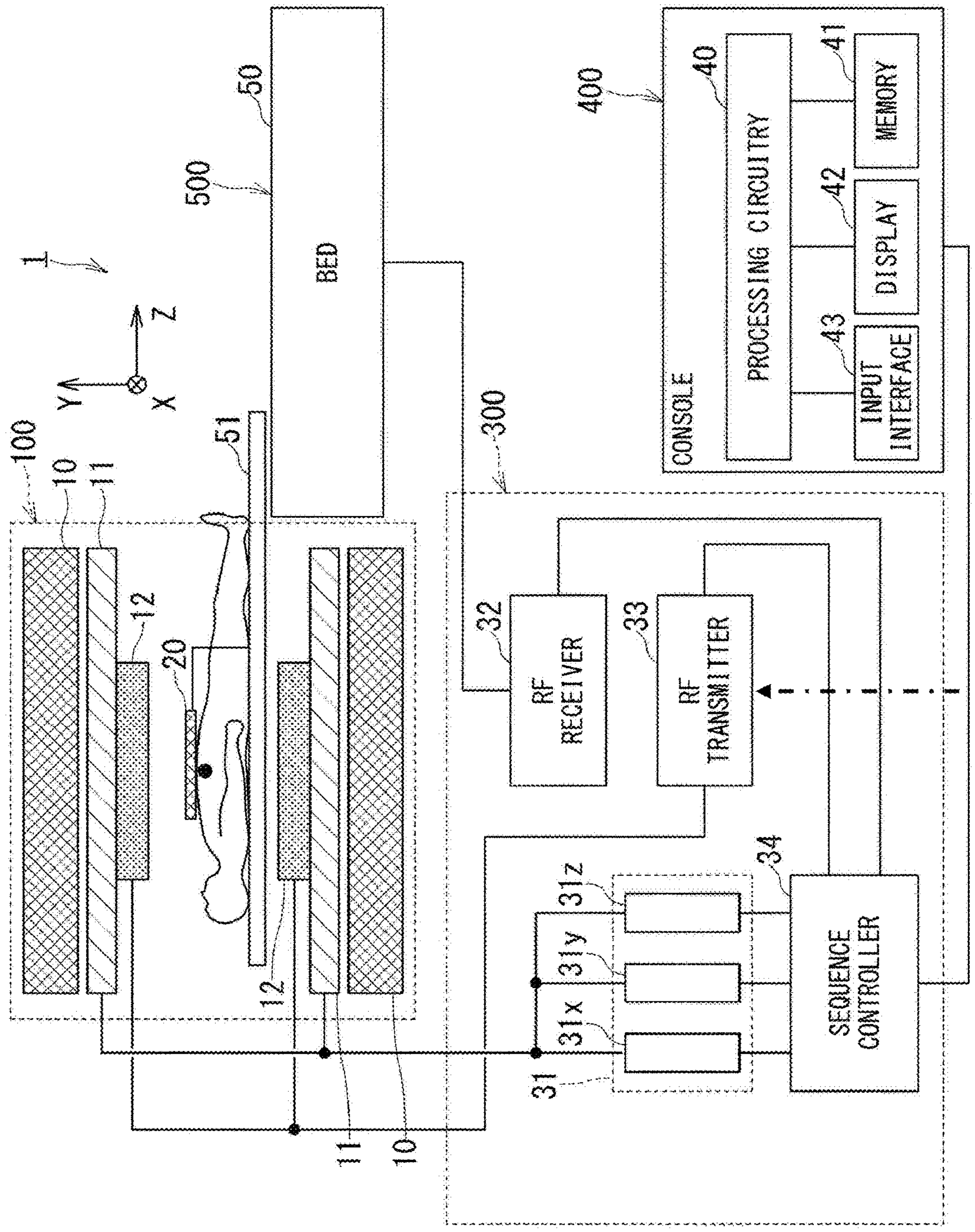
FIG. 2 illustrates a schematic block diagram of an MRI system according to an exemplary implementation of the present disclosure.

Referring now to the drawings, wherein like reference numerals designate identical or corresponding parts throughout the several views, FIG. 2 is a block diagram illustrating an overall configuration of an MRI apparatus 1 according to the first embodiment. The MRI apparatus 1 of the first embodiment includes a gantry 100, a control cabinet 300, a console 400, and a bed 500.

The gantry 100 includes a static magnetic field magnet 10, a gradient coil assembly 11, and a whole body (WB) coil 12, and these components are housed in a cylindrical housing. The bed 500 includes a bed body 50 and a table 51. In addition, the MRI apparatus 1 includes at least one RF coil 20 to be disposed close to an object.

The control cabinet 300 includes three gradient coil power supplies 31 (31 *x* for an X-axis, 31 *y* for a Y-axis, and 31 *z* for a Z-axis), an RF receiver 32, an RF transmitter 33, and a sequence controller 34.

The static magnetic field magnet 10 of the gantry 100 is substantially in the form of a cylinder, and generates a static magnetic field inside a bore, which is a space formed inside the cylindrical structure and serves as an imaging region of the object (for example, a patient). The static magnetic field magnet 10 includes a superconducting coil inside, and the superconducting coil is cooled down to an extremely low temperature by liquid helium. The static magnetic field magnet 10 generates a static magnetic field by supplying the superconducting coil with an electric current to be provided from a static magnetic field power supply (not shown) in an excitation mode. Afterward, the static magnetic field magnet 10 shifts to a permanent current mode, and the static magnetic field power supply is separated. Once it enters the permanent current mode, the static magnetic field magnet 10 continues to generate a strong static magnetic field for a long time, for example, over one year. Note that the static magnetic field magnet 10 may be configured as a permanent magnet.

The gradient coil assembly 11 is also substantially in the form of a cylinder and is fixed to the inside of the static magnetic field magnet 10. The gradient coil assembly 11 has a three-channel structure and includes an X-axis gradient coil 11 *x*, a Y-axis gradient coil 11 *y*, and a Z-axis gradient coil 11 *z* (not shown individually). The X-axis gradient coil 11 *x* is supplied with electric current from the gradient magnetic field power supply 31 *x* so as to generate a gradient magnetic field Gx in the X-axis direction. The Y-axis gradient coil 11 *y* is supplied with electric current from the gradient magnetic field power supply 31 *y* so as to generate a gradient magnetic field Gy in the Y-axis direction. The Z-axis gradient coil 11 *z* is supplied with electric current from the gradient magnetic field power supply 31 *z* so as to generate a gradient magnetic field Gz in the Z-axis direction.

The bed body 50 of the bed 500 can move the table 51 in the vertical direction and in the horizontal direction. The bed body 50 moves the table 51 with an object placed thereon to a predetermined height before imaging. Afterward, when the object is imaged, the bed body 50 moves the table 51 in the horizontal direction so as to move the object to the inside of the bore.

The WB body coil 12 is shaped substantially in the form of a cylinder so as to surround the object, and is fixed to the inside of the gradient coil assembly 11. The WB coil 12 applies RF pulses to be transmitted from the RF transmitter 33 to the object, and receives magnetic resonance (MR) signals emitted from the object due to excitation of hydrogen nuclei.

The RF coil 20 receives MR signals emitted from the object at a position close to the object. The RF coil 20 includes plural coil elements, for example. Depending on the anatomical imaging part of the object, there are various RF coils 20 such as for the head, for the chest, for the spine, for the lower limbs, and for the whole body. Of these various RF coils, FIG. 2 illustrates the RF coil 20 for imaging the chest.

The RF transmitter 33 transmits an RF pulse to the WB coil 12 on the basis of an instruction from the sequence controller 34. The RF receiver 32 detects MR signals received by the WB coil 12 and/or the RF coil 20, and transmits raw data obtained by digitizing the detected MR signals to the sequence controller 34.

The sequence controller 34 performs a scan of the object by driving the gradient coil power supplies 31, the RF transmitter 33, and the RF receiver 32 under the control of the console 400. When the sequence controller 34 receives the raw data from the RF receiver 32 by performing the scan, the sequence controller 34 transmits the received raw data to the console 400.

The sequence controller 34 includes processing circuitry (not shown). This processing circuitry is configured as, for example, a processor for executing predetermined programs or configured as hardware such as a field programmable gate array (FPGA) and an application specific integrated circuit (ASIC).

The console 400 is configured as a computer that includes processing circuitry 40, a memory 41, a display 42, and an input interface 43.

The memory 41 is a recording medium including a read-only memory (ROM) and a random access memory (RAM) in addition to an external memory device such as a hard disk drive (HDD) and an optical disc device. The memory 41 stores various programs to be executed by a processor of the processing circuitry 40 as well as various data and information.

The display 42 is a display device such as a liquid crystal display panel, a plasma display panel, and an organic EL panel.

The input interface 43 includes various devices for an operator to input various data and information, and is configured of, for example, a mouse, a keyboard, a trackball, and/or a touch panel.

The processing circuitry 40 is, for example, a circuit provided with a central processing unit (CPU) and/or a special-purpose or general-purpose processor. The processor implements various functions described below by executing the programs stored in the memory 41. The processing circuitry 40 may be configured of hardware such as an FPGA and an ASIC. The various functions described below can also be implemented by such hardware. Additionally, the processing circuitry 40 can implement the various functions by combining hardware processing and software processing based on its processor and programs.

The console 400 controls the entirety of the MRI apparatus 1 with these components. Specifically, the console 400 accepts imaging conditions such as the type of pulse sequence, various information, and an instruction to start imaging to be inputted by a user such as a medical imaging technologist through the input interface 43 including a mouse and a keyboard. The processing circuitry 40 causes the sequence controller 34 to perform a scan on the basis of the inputted imaging conditions and reconstructs an image on the basis of the raw data transmitted from the sequence controller 34, i.e., digitized MR signals. The reconstructed image is displayed on the display 42 and is stored in the memory 41.

In the configuration of the MRI apparatus 1 shown in FIG. 2, the control cabinet 300, the gantry 100, and the bed 500 (i.e., all the components except the console 400) constitute an imaging unit or scanner.

Figure 3:
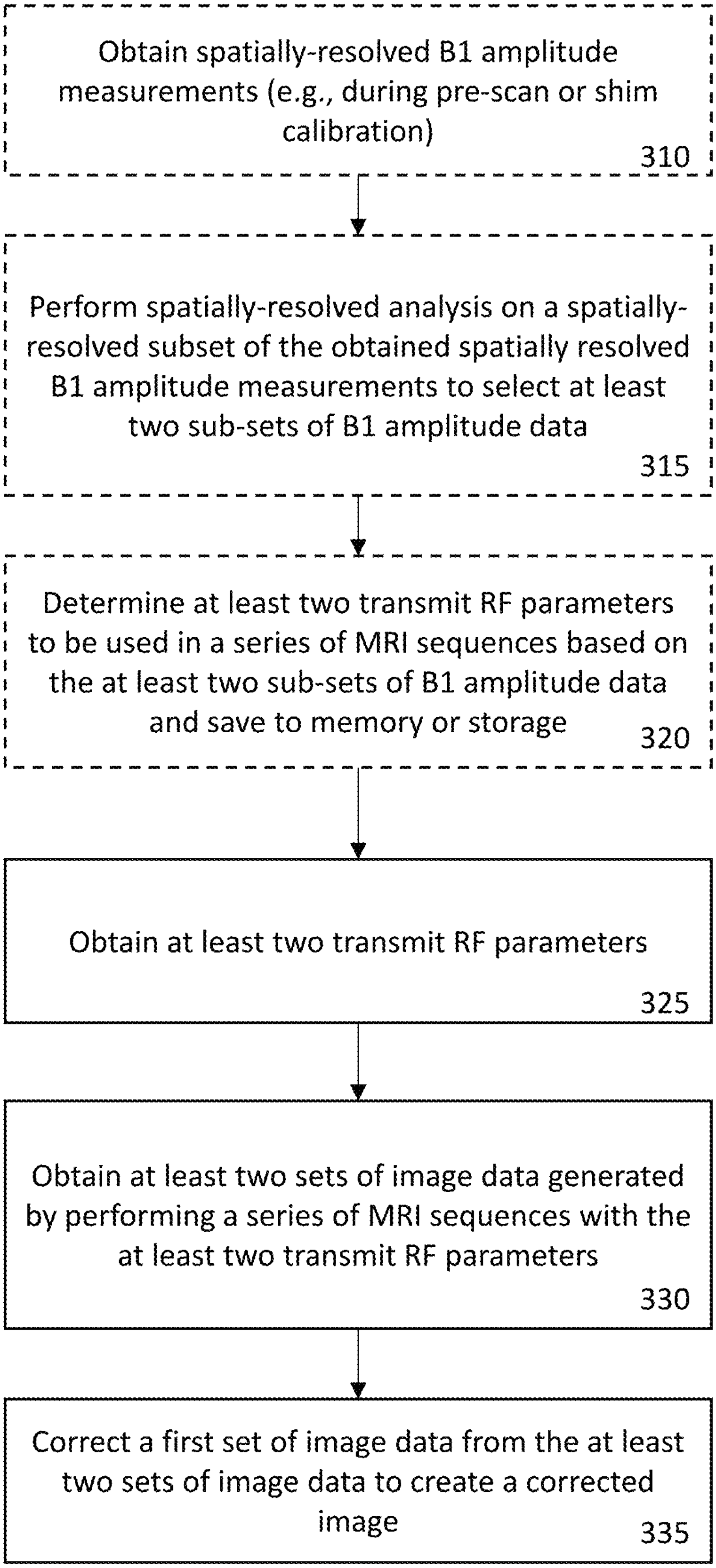
FIG. 3 illustrates a flowchart showing first exemplary processing steps for obtaining a corrected MRI image by performing spatially-resolved B1 amplitude-based tuning.

FIG. 3 illustrates a flowchart showing an exemplary method 305 including exemplary processing steps for obtaining a corrected MRI image by using at least two different transmit RF parameters (e.g., first and second transmit RF parameters) to obtain at least two sets of image data (e.g., first and second sets of image data). Method 305 includes core steps 325, 330, and 335 and a number of other optional steps (shown in dashed boxes) that will be described in greater detail below.

In step 325, at least two transmit RF parameters are obtained (e.g., read from memory or storage (either by themselves or as part of the scan sequences for obtaining series of MRI sequences)) for imaging a same portion of an object to be imaged (e.g., for imaging a same slice of a patient). The at least two transmit RF parameters for obtaining respective first and second sets of image data can be, for example, respective first and second RFLs, first and second RF gains, first and second RF phases, and first and second RF shim settings. The at least two transmit RF parameters further can include any combinations of those parameters (e.g., gain1 and phase1 for obtaining a first set of image data for the slice and gain2 and phase2 for obtaining a second set of image data for the same slice). As used herein, the first and second "phases" are intended to mean phases between real and imaginary components of an RF signal produced by the transmitter as opposed to phase cycling patterns.

Control then passes from step 325 to step 330 so that at least two sets of image data can be obtained that were generated by performing the series of MRI sequences using the at least two transmit RF parameters. After step 330, control passes to step 335, and a first set of the at least two sets of image data is corrected to create a corrected MRI data image, thereby completing the method 305.

The at least two transmit RF parameters can be obtained using several different techniques. In a first technique, the method 305 obtains the at least two transmit RF parameters using illustrated steps 310-320. In step 310, the MRI apparatus 1 (or a remote system communicating with and working in conjunction with the MRI apparatus 1) obtains spatially-resolved B1 amplitude measurements of an object (e.g., a person to be imaged) (e.g., at an initial RFL set in accordance with a set of MRI sequences to be obtained of the object). Exemplary processes for obtaining spatially-resolved B1 amplitude data include, but are not limited to, performing Bloch-Siegert Shift (BSS) processing, Actual Flip angle Imaging (AFI), Dual Refocusing Echo Acquisition Mode (DREAM), Double Angle Method (DAM) processing, Phase-sensitive (PS) processing, and Saturation recovery (SR) processing. The obtained spatially-resolved B1 amplitude measurements may be obtained as a 1D projection, a 2D slice, and a 3D volume, and subsets of the measurements may be used rather than complete sets of measurements.

As used herein, "obtain" is intended to mean receive from a memory 41 or storage system of the MRI system 1 or receive from an external source in its entirety. "Obtain" is also intended to mean that a portion of the information is obtained from one source and then augmented with additional information or modified such that the combined/modified information is then accessible to the MRI system 1 (e.g., stored in the memory 41 or in a storage system of the MRI system 1). For example, the series of MRI sequences may be obtained from one source (memory 41 or an external device) and then augmented with additional information such as spatially-resolved B1 amplitude measurement sequences. Likewise, the series of MRI sequences may be obtained from one source (memory 41 or an external device) and then modified to change the at least one initial RF imaging parameter.

Figure 4A:
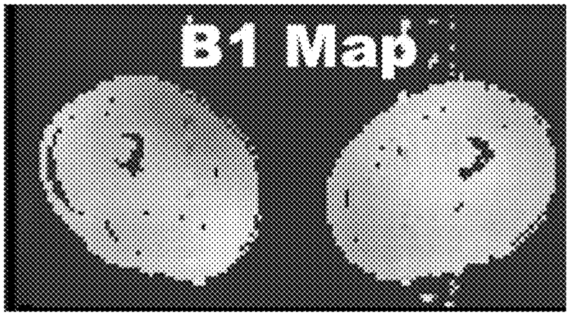
FIG. 4A is a color representation of spatially-resolved B1 amplitude data obtained when determining B1 amplitude distributions that would occur when imaging a pair of human thighs at an initial RF transmitter gain level (RFL) acting as an initial RF parameter.

FIG. 4A is a color representation of spatially-resolved B1 amplitude data obtained (e.g., using BSS or AFI methods of B1 mapping) when determining B1 amplitude distributions that would occur when imaging a pair of human thighs at an initial RFL level (i.e., the RFL such that the average B1 value across a region being imaged is expected to be 1.0). As illustrated, a complete B1 amplitude map is obtained that corresponds to a particular cross-section of the object (e.g., person) to be imaged, although less than a complete B1 amplitude map for the cross-section also may be obtained. The B1 amplitude data may be obtained during a portion of a pre-scan that performs B1 shim calibration and, therefore, does not extend the processing time of the MRI process as a whole. Alternatively, if B1 shim calibration is not used, then a fast projection may be used and may require only a short scan time (e.g., approximately 60-80 ms). In yet another embodiment, the B1 amplitude data may be obtained after a portion of a pre-scan that performs B1 shim calibration so that the B1 amplitude data is as consistent as possible prior to obtaining the spatially-resolved B1 amplitude measurements. In alternate embodiments, complete or partial B1 amplitude maps also may be obtained for additional cross-sections.

Figure 4B:
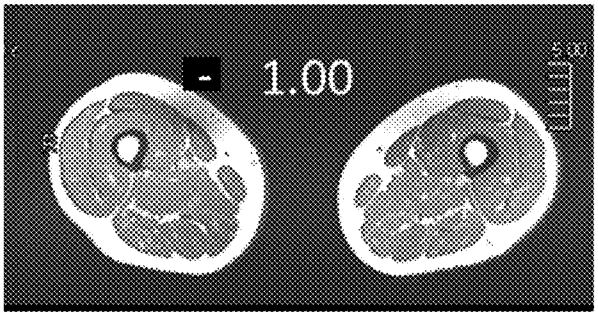
FIG. 4B is an MRI image of the pair of thighs of FIG. 4A when imaged at the initial RFL.

FIG. 4B is an MRI image of the pair of thighs of FIG. 4A when imaged at the initial RFL. FIG. 4B includes an annotation '-' on the top right portion of the thigh shown on the lefthand side ("the left thigh") to accentuate a shadow on the left thigh. The shadow corresponds to the blue and green portions of the B1 map of FIG. 4A indicating that the B1 amplitude data is not the B1 target value of 1.0 (shown in yellow in FIG. 4A) but a value less than the B1 target value that causes signal distortion due to undertipping. The green portions correspond to approximately 80% of the target B1, and the blue portions correspond to about 60% of the target B1 with the amplitude values decreasing towards the center of the blue portion and increasing going away from the center of the blue portion. The blue and green portions of FIG. 4A correspond to the darker portions of the greyscale B1 amplitude map of FIG. 4I. Those regions are highlighted in the annotated B1 amplitude map of FIG. 4J where the outer white ovals correspond to the green regions having B1 values of approximately 80% of the target B1, and the inner white ovals correspond to the blue regions having B1 values of approximately 60% of the target B1. In FIG. 4J, the amplitude values decrease towards the center of the inner oval and increase going away from the center of the inner oval.

Figure 4C:
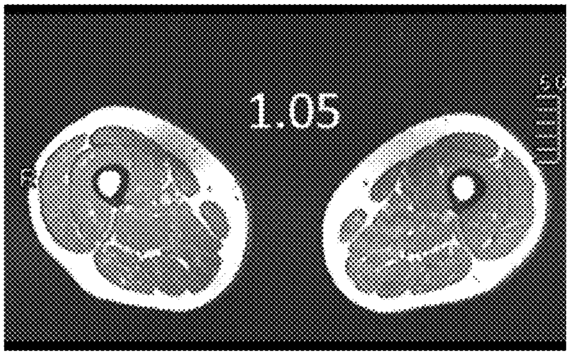
FIGS. 4C-4H are MRI images of the pair of thighs of FIGS. 4A and 4B when imaged at progressively higher RFLs than the initial RFL of FIG. 4B.
Figure 4D:
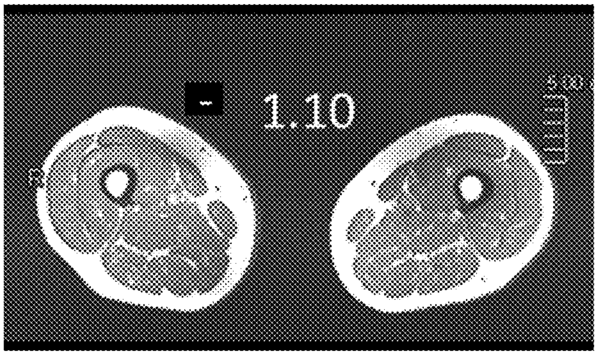
Figure 4E:
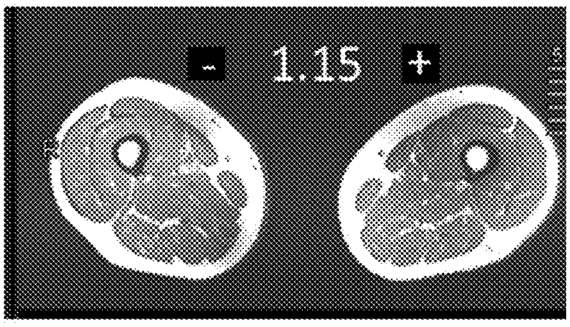
Figure 4F:
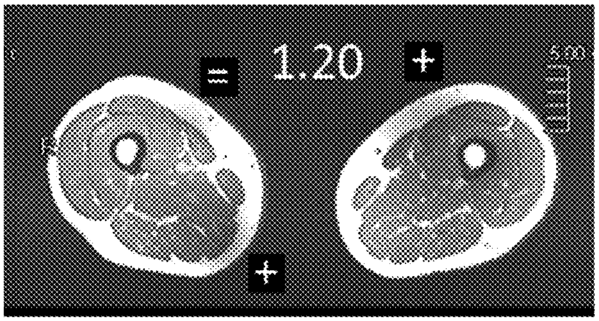
Figure 4G:
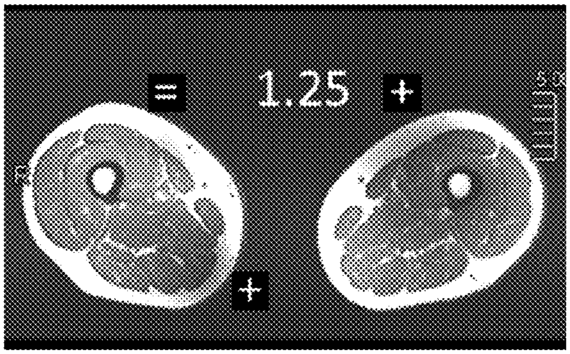
Figure 4H:
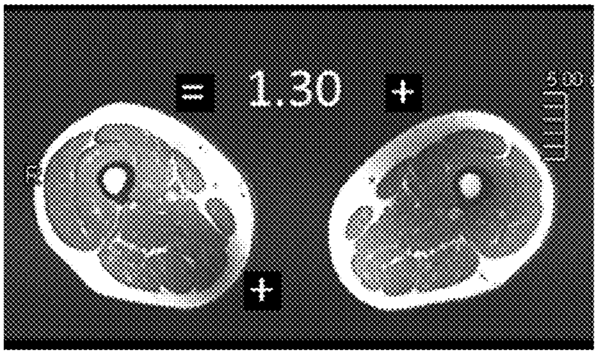
Figure 4I:
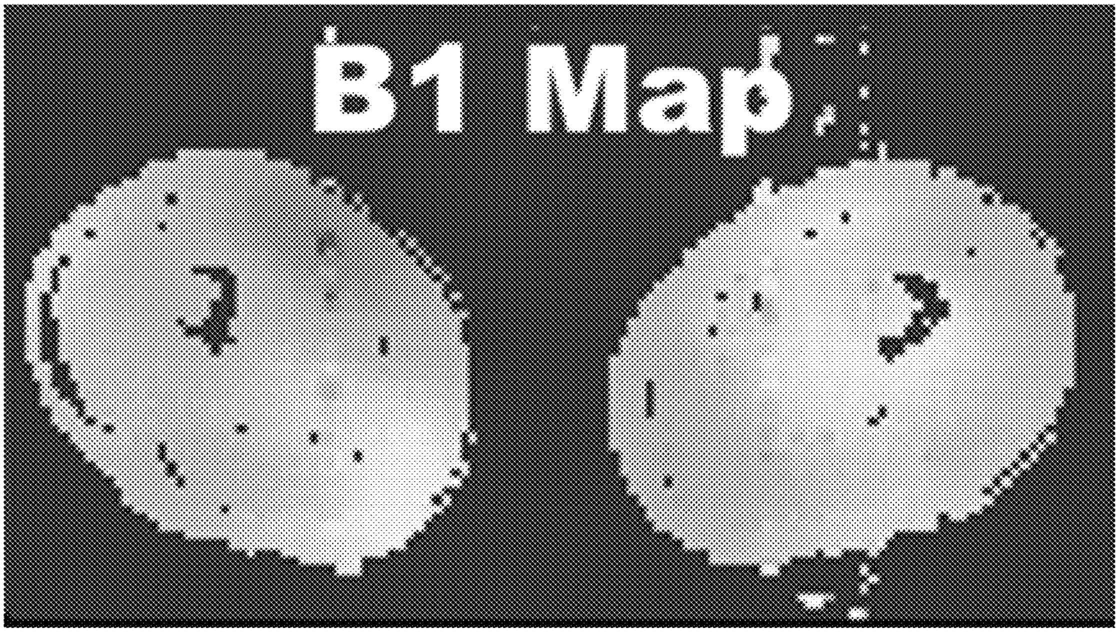
FIG. 4I is a greyscale version of the spatially-resolved B1 amplitude data of FIG. 4A.
Figure 4J:
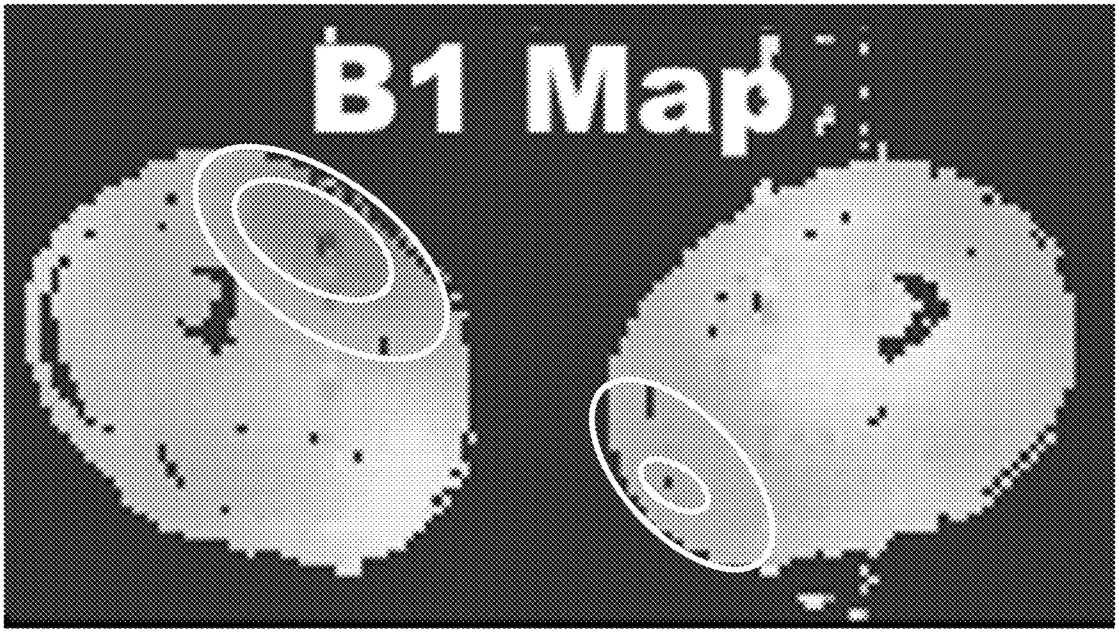
FIG. 4J is an annotated version of the greyscale representation of the spatially-resolved B1 amplitude data of FIG. 4I showing two dark areas representing B1 amplitude data below the intended average value.

FIGS. 4C-4H are MRI images of the pair of thighs of FIGS. 4A and 4B when imaged at progressively higher RFLs than the initial RFL (i.e., at 1.05, 1.10, 1.15, 1.20, 1.25, and 1.30 times higher than the initial RFL). As can be seen in FIG. 4C, when imaged at av RFL 1.05 times that of FIG. 4B (i.e., 1.05×), the portion of the image that has signal distorted by undertipping in FIG. 4B is improved (i.e., has less of a shadow) as compared with FIG. 4B, but a shadow still remains. As RFL increases to 1.10× and 1.15×, the effect of undertipping continues to decrease until about 1.20× where the shadow begins to disappear in FIG. 4F (as noted by the annotation '='). However, the increase in RFL brings with it an overtipping in the thigh on the right starting at least at an RFL of 1.15× (in FIG. 4E) and with it worsening of other portions of the image (as noted by the annotation '+'). Even greater power RFLs show at least two regions with overtipping in FIGS. 4G and 4H (also denoted by '+').

Returning to the explanation of the method 305 of FIG. 3, having obtained the spatially-resolved B1 amplitude measurements in step 310, control passes to step 315 where a spatially-resolved analysis is performed on a spatially-resolved subset of the obtained spatially-resolved B1 amplitude data in order to address at least one of undertipping and overtipping issues that would result from using the initial RFL of the obtained series of MRI sequences. As a result of the spatially-resolved analysis performed on the obtained spatially-resolved B1 amplitude data, at least two sub-sets of B1 data are obtained as described in greater detail below. Exemplary sub-sets include, but are not limited to, a first sub-set representing a first B1 parameter range such as locations having low B1 values and a second sub-set representing a first B1 parameter range such as locations having high B1 values. In one embodiment, the received spatially-resolved B1 amplitude measurements are quantized, optionally filtered, and then subjected to histogram processing in order to produce the at least two sub-sets. For example, obtained B1 amplitude data is quantized into different values that are used to calculate the histogram.

Prior to calculating the histogram, the B1 amplitude data may be subjected to filtering. For example, values below a particular threshold may be discarded as corresponding to air as opposed to tissue that is the portion that is of interest to the image reviewer (e.g., a medical professional such as a radiologist). Similarly, values that are beyond a statistical threshold amount (e.g., four standard deviations) from the average value of the values may be discarded as being likely anomalous data. Furthermore, a location-based mask may be applied to the data such that any of the values from outside the mask area are discarded. The mask area may be obtained via input from the operator of the MRI apparatus or may be selected automatically by the apparatus based on factors, stored in memory 41, such as the type of region being imaged (e.g., thigh, prostate, skull, and pelvis), and/or patient-specific parameters (e.g., a weight of a patient that may affect the size/location of the region being imaged with respect to a center of an imaging area). Alternatively, the B1 amplitude data may be filtered and then quantized.

The number of occurrences of quantized data values across the set of B1 amplitude values being processed are then determined from the histogram, and processing based on the calculated information can be performed in step 320. As will be discussed in greater detail below, the set of B1 amplitude values being processed may be from at least 1D projection, from a partial or a complete slice (i.e., two-dimensional data), or from a partial or complete three-dimensional volume.

In a first embodiment of step 320, spatially-resolved processing is performed to obtain at least two sub-sets of extreme values in the B1 amplitude data. For example, the first sub-set is selected to be the lowest X % (e.g., 10% or 15%) of the B1 amplitude data and is used to increase the average B1 value that will be produced during imaging. (As used herein, "X" is considered as a first "extreme" threshold percentage.) The second subset, rather than using the lower extreme values, is selected to be the higher extreme values (e.g., the highest Y %, such as 10% or 15%) and is used to decrease the average B1 value that will be produced during imaging.

Using the data from the at least two sub-sets, the method determines the at least two transmit RF parameters to be used when creating a corrected MRI image. In one such embodiment, the first transmit RF parameter is calculated (or otherwise determined) based on the RFL that would result in an average B1 value of a predetermined target amount (B1 target) (e.g., 1.0) that was obtained in step 310. The B1 target value is modified by dividing the B1 target value by the average value of the first sub-set which, in the exemplary embodiment, is the lowest X % of the B1 amplitude values of the histogram (where that average is referred to as "B1 low region"). Accordingly, the new low region RFL ($\text{NewRFL}_{low\ region}$) that would be used instead of the initial RFL ($\text{RFL}_{initial}$) producing, on average, the B1 target value is calculated as:

$$\text{New}RFL_{low\ region}=RFL_{initial}*(B1_{target})/(B1_{low\ region}). \quad \text{(Eq. 1)}$$

Such a modification would raise B1 in the dark hole regions, but some regions may end up being overtipped as a result.

In an alternate embodiment, to avoid overtipping, the B1 target value is initially reduced by a reduction factor (RFx) (e.g., 0.85) so that very low B1 values in regions of low B1 values do not unduly modify the resulting image quality. In one such embodiment, the new low region RFL would be calculated as:

$$\text{New}RFL_{low\ region}=RFL_{initial}*(RFx*B1_{target})/(B1_{low\ region}). \quad \text{(Eq. 2)}$$

In yet another embodiment, the new low region RFL value is limited by a predetermined maximum percentage (maxfactor) using, for example, a maximum function (max(x,y)), where the result is no greater than "x". One such embodiment is described by Equation (3) below.

$$\text{New}RFL_{low\ region}=\max(RFL_{initial}*\text{maxfactor},\ RFL_{initial}*(B1_{target})/(B1_{low\ region})). \quad \text{(Eq. 3)}$$

The second transmit RF parameter is calculated (or otherwise determined) by dividing the $\text{B1}_{target}$ value by the average value of the second sub-set which, in the exemplary embodiment, is the highest X % of the B1 amplitude values of the histogram (where that average is referred to as "$\text{B1}_{high\ region}$"). Accordingly, the new high region RFL ($\text{NewRFL}_{high\ region}$) that would be used instead of the initial RFL ($\text{RFL}_{initial}$) producing, on average, the B1 target value is calculated as:

$$\text{New}RFL_{high\ region}=RFL_{initial}*(B1_{target})/(B1_{high\ region}). \quad \text{(Eq. 4)}$$

Such a modification would lower B1 in the overtipped regions, but some regions may end up being undertipped as a result.

In an alternate embodiment, to reduce undertipping, the B1 target value is initially increased by a modification factor (MFx) (e.g., 1.2) so that very high B1 values in regions of high B1 values do not unduly modify the resulting image quality. In one such embodiment, the new high region transmitter RFL would be calculated as:

$$\text{New}RFL_{high\ region}=RFL_{initial}*(RFx*B1_{target})/(B1_{high\ region}). \quad \text{(Eq. 5)}$$

In yet another embodiment, the new high region RFL value is limited by a predetermined minimum percentage (minfactor) using, for example, a minimum function (min (x,y)), where the result is at least "x". One such embodiment is described by Equation (3) below.

$$\text{New}RFL_{high\ region}=\min(RFL_{initial}*\text{minfactor},\ RFL_{initial}*(B1_{target})/(B1_{high\ region})). \quad \text{(Eq. 6)}$$

Having determined the at least two transmit RF parameters (e.g., the first and second new RFLs) to be used in a series of MRI sequences, the determined at least two transmit RF parameters are saved to memory or storage (either by itself or as part of the scan sequences for obtaining series of MRI sequences). In some embodiments, steps 310-335 are performed in a single MRI apparatus 1. Alternatively, in other embodiments, some steps (e.g., steps 315 and 320) are performed outside of the MRI apparatus 1, and the MRI apparatus 1 reads the stored at least two RF parameter values from the memory in step 325 (e.g., when obtaining the corresponding series of MRI sequences).

The analyses on the received spatially-resolved B1 amplitude data is not limited to the processing described above with respect to steps 315 and 320. In alternate embodiments, the histogram processing is replaced by a number of alternate processing methods described below.

Figure 5A:
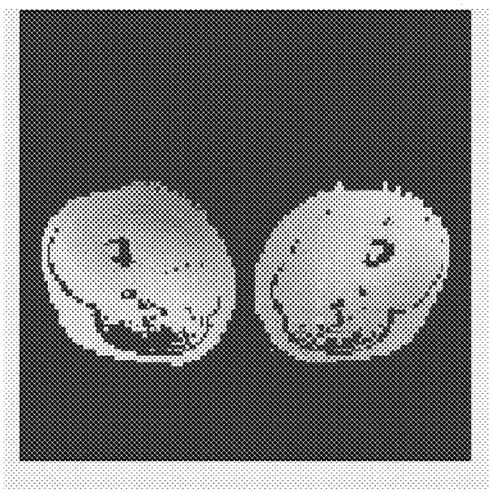
FIG. 5A is a color spatially-resolved B1 amplitude map showing variations in B1 amplitude across a portion of an object to be imaged.

In a first alternate embodiment, the histogram of a full slice is replaced with region of interest processing based on analysis (e.g., visual or automated inspection) of spatially-resolved B1 amplitude data in one-, two-, or three-dimensions. FIG. 5A is a color spatially-resolved B1 amplitude map showing variations in B1 amplitude across a two-dimensional portion of an object to be imaged that can be obtained through the processing of step 310. In an embodiment where an MRI operator is shown the map of FIG. 5A, the MRI operator can, using the input interface 43, select at least one region of interest in the map. FIG. 5B illustrates an exemplary region of interest which the MRI operator has drawn on the B1 amplitude map to indicate the region(s) of interest (i.e., where the system should select the values to use in statistical processing to determine high and/or low regions to use to modify the initial RFL).

Figure 5C:
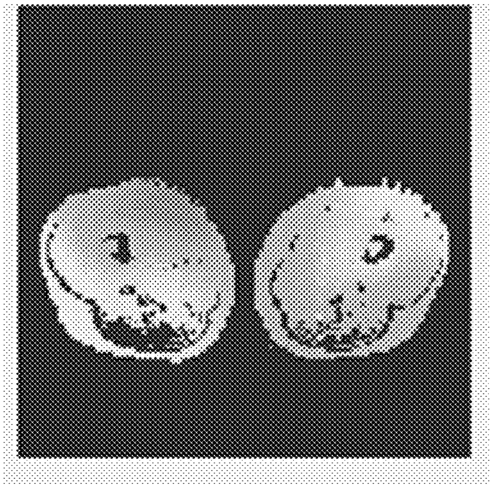
FIG. 5C is a greyscale version of the spatially-resolved B1 amplitude map of FIG. 5A.
Figure 5B:
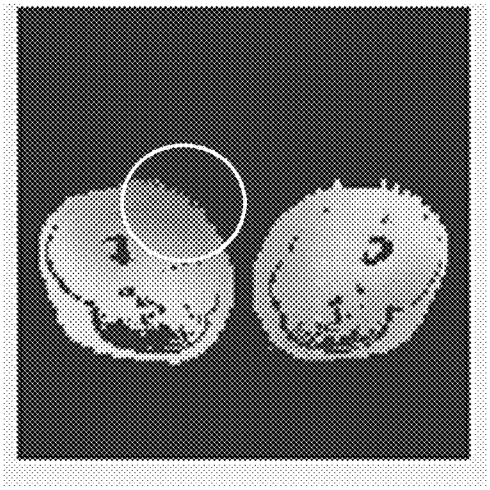
FIG. 5B is an annotated version of the color spatially-resolved B1 amplitude map of FIG. 5A showing a selected circular region of interest to be used to determine an amount of correction to be applied to an initial RF imaging parameter.
Figure 5D:
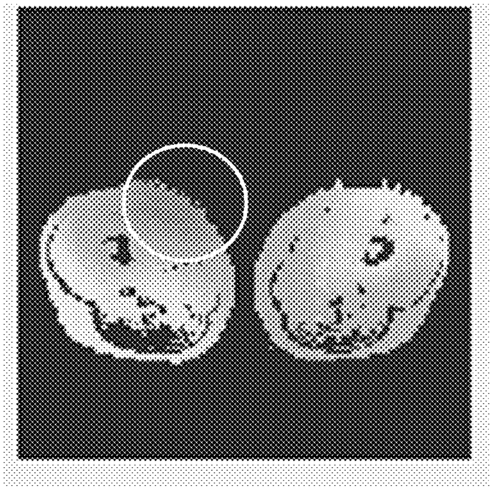
FIG. 5D is an annotated greyscale version of the color spatially-resolved B1 amplitude map of FIG. 5A showing a selected circular region of interest to be used to determine an amount of correction to be applied to an initial RF imaging parameter.

FIG. 5C is a greyscale spatially-resolved B1 amplitude map showing variations in B1 amplitude across a two-dimensional portion of an object to be imaged that can be obtained through the processing of step 310 and can be used instead of the color version of FIG. 5A. In an embodiment where an MRI operator is shown the map of FIG. 5C, the MRI operator can, using the input interface 43, select at least one region of interest in the map. FIG. 5D illustrates an exemplary region of interest which the MRI operator has drawn on the B1 amplitude map to indicate the region(s) of interest (i.e., where the system should select the values to use in statistical processing to determine high and/or low regions to use to modify the initial RFL).

FIG. 5B is an annotated version of the color spatially-resolved B1 amplitude map of FIG. 5A showing a circular region of interest drawn or selected by an MRI operator to be used to define the mask of where values are to be selected from to determine an amount of correction to be applied to an initial RF imaging parameter. Shapes other than a circle may be used to specify a two-dimensional region of interest. The shapes, the locations of the shapes, and the size of the shapes may be selected automatically by the apparatus based on factors such as the type of region being imaged (e.g., thigh, prostate, skull, and pelvis), and/or patient-specific parameters (e.g., a weight of a patient that may affect the size/location of the region being imaged with respect to a center of an imaging area). In such a configuration, the two-dimensional region of interest is used like a mask to exclude unwanted data outside of the two-dimensional region of interest, even if it is along the 1D projection.

Alternatively, the MRI apparatus 1 may acquire B1 data in the form of 1D projection data. The geometric orientation of the 1D projection(s) may be selected automatically by the apparatus based on factors such as the type of region being imaged (e.g., thigh, prostate, skull, and pelvis), and/or patient-specific parameters (e.g., a weight of a patient that may affect the size/location of the region being imaged with respect to a center of an imaging area).

In an embodiment using automated inspection, the method utilizes at least one of (1) an artificial neural network trained to produce at least two correction factors from spatially-resolved B1 amplitude data and (2) a priori empirical knowledge of the expected location(s) of the region(s) of low/high B1 to automatically select at least one region of interest. For example, based on the region of the object to be scanned, locations of regions of interest having low/high B1 values can be stored in memory 41 along with any factors that may change the locations of the regions of interest (e.g., type of region being imaged and/or patient-specific parameters). For example, due to the physical dielectric effect and roughly cylindrical shape of most patients' legs, the approximate location of low B1 ($\Delta B1<1$) and high B1 ($\Delta B1>1$) regions are in approximately the same locations for all humans of the same size, and thus the locations of these regions may be known reliably a priori. Small changes in the regions may be made based on a preceding locator image (e.g. a 'scout' image) which is commonly acquired in MR exam to guide the planning of scans in the protocol.

Figure 6A:
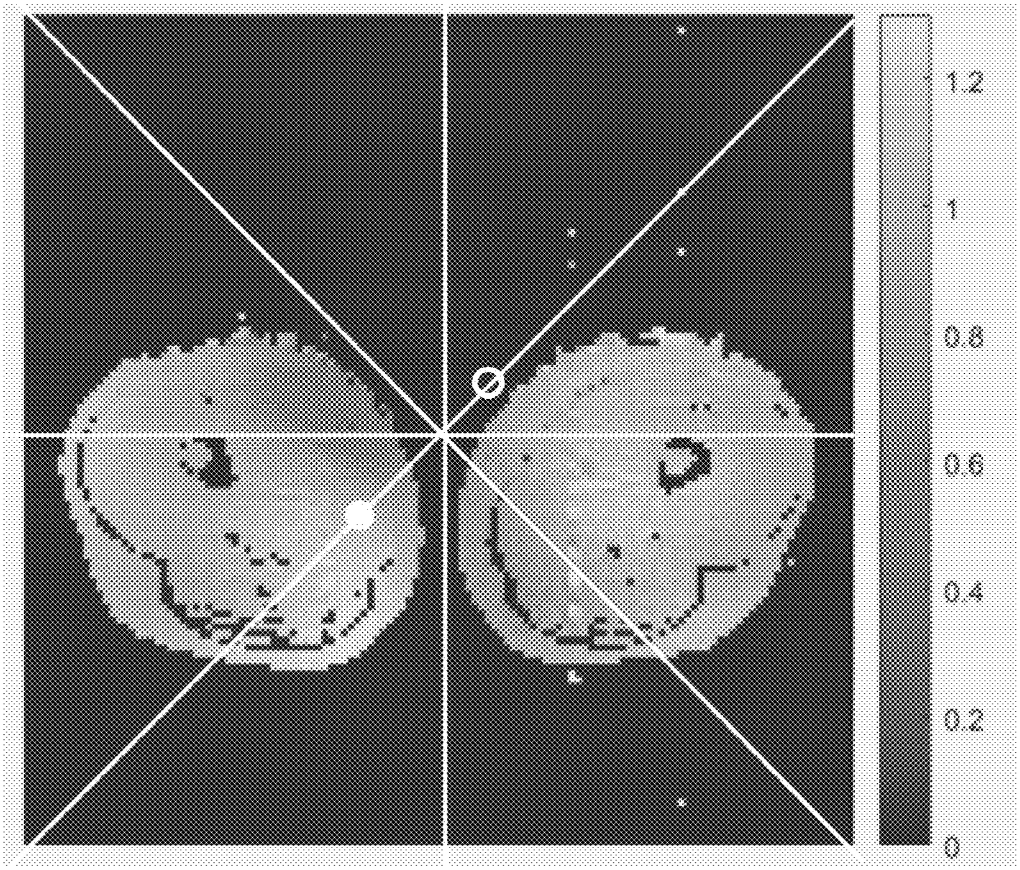
FIG. 6A is an exemplary color B1 amplitude map of a subject's thighs.
Figure 6B:
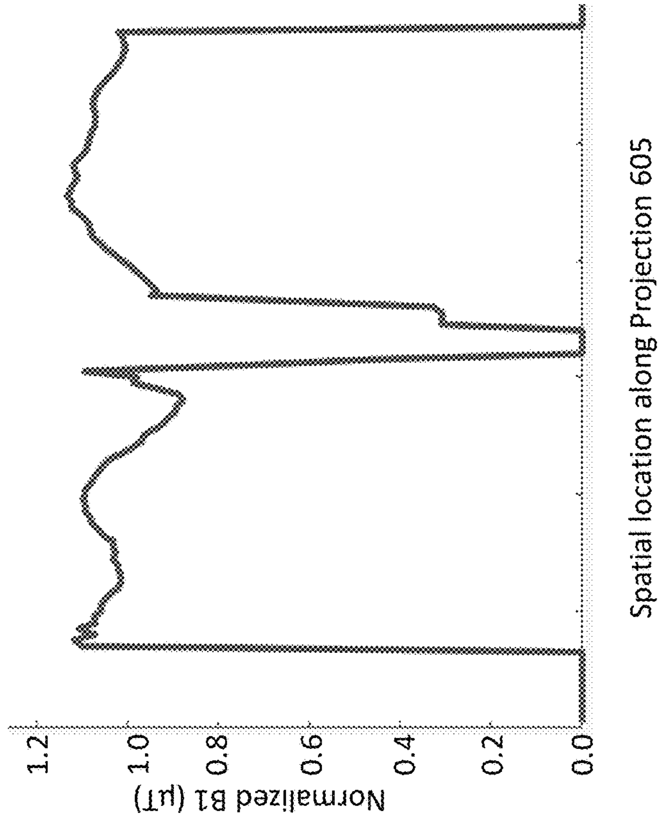
FIG. 6B is a B1 amplitude projection corresponding to projection orientation displayed by line 605 of FIG. 6A.
Figure 6C:
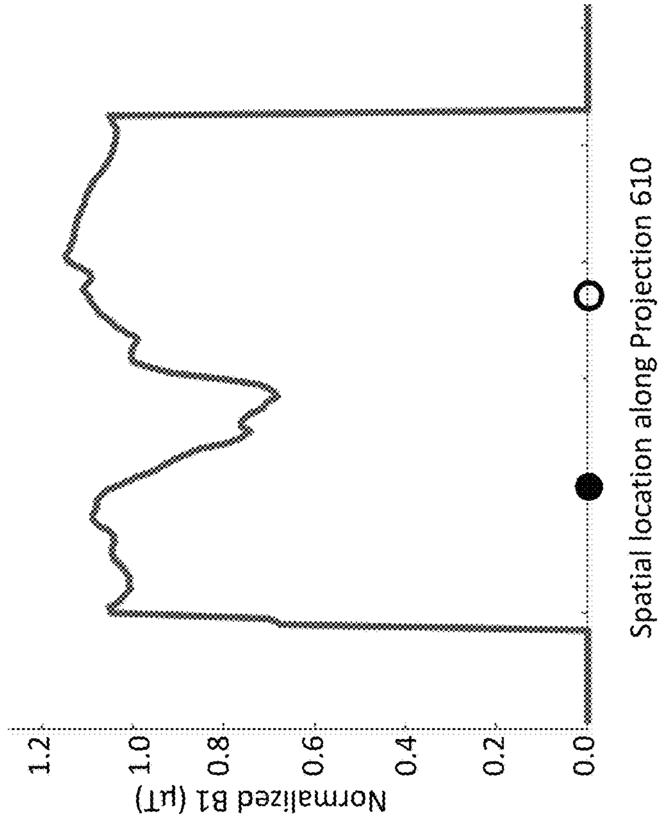
FIG. 6C is a B1 amplitude projection corresponding to projection orientation displayed by line 610 of FIG. 6A.
Figure 6D:
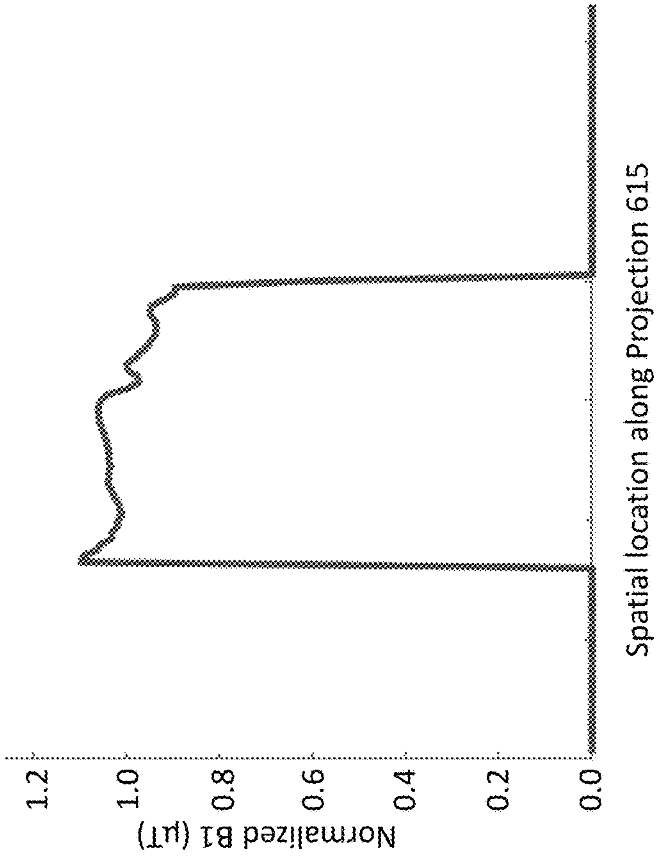
FIG. 6D is a B1 amplitude projection corresponding to projection orientation displayed by line 615 of FIG. 6A.
Figure 6E:
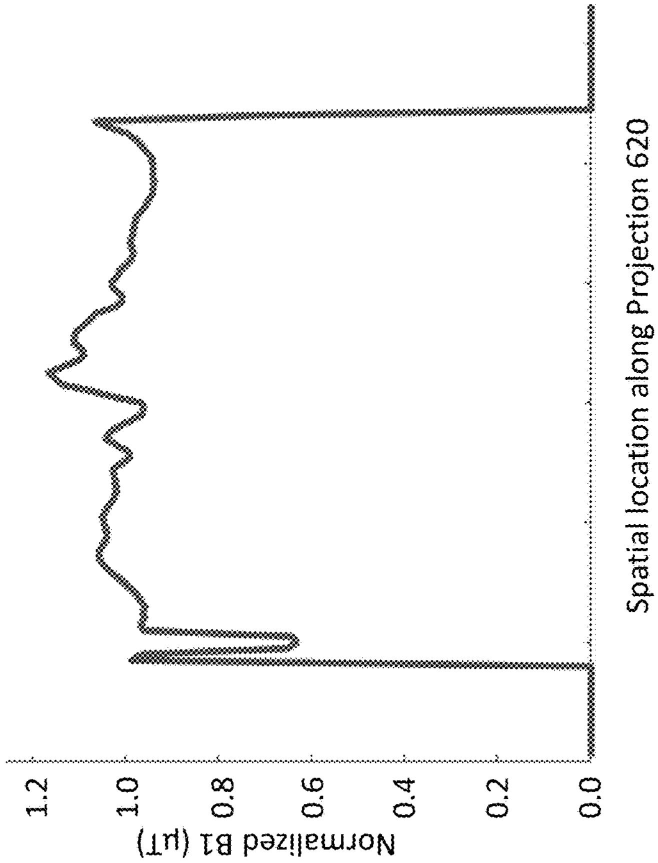
FIG. 6E is a B1 amplitude projection corresponding to projection orientation displayed by line 620 of FIG. 6A.
Figure 6F:
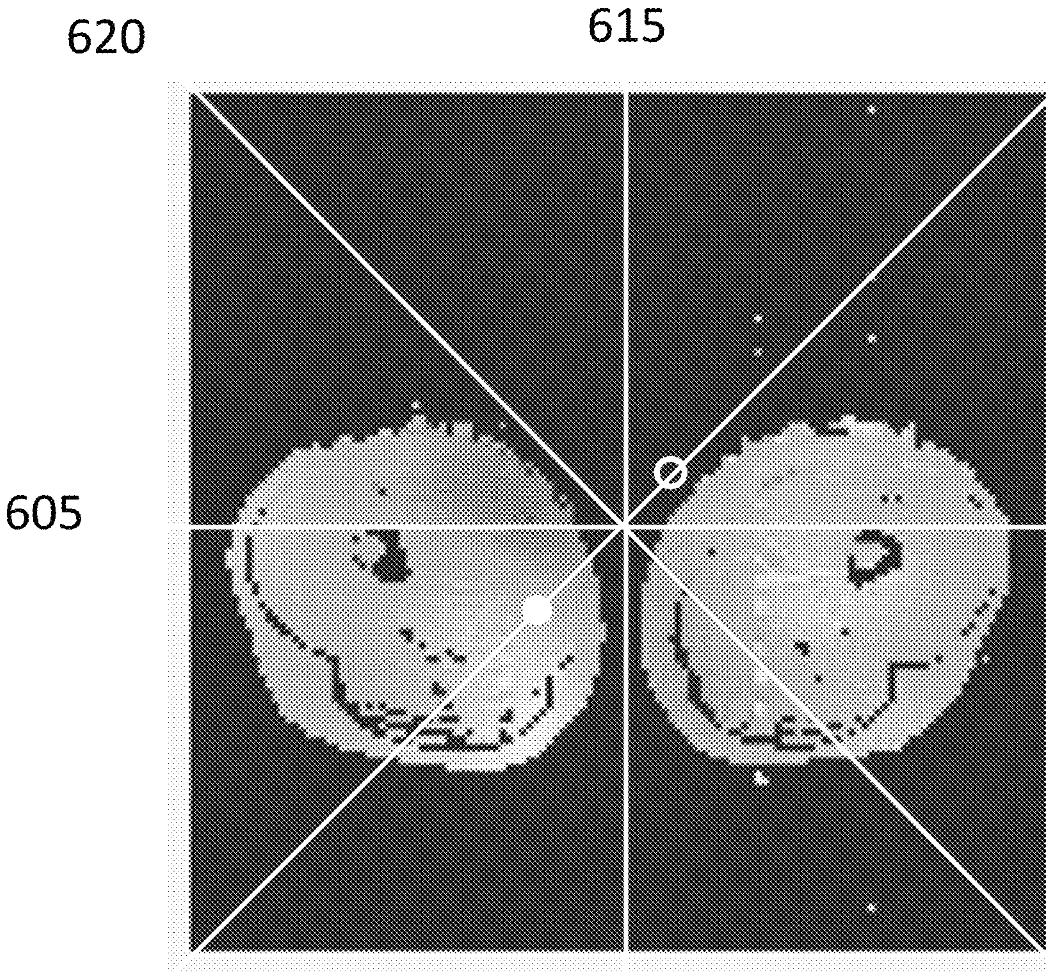
FIG. 6F is an exemplary greyscale B1 map of FIG. 6A.

FIGS. 6A to 6F illustrate how the choice of 1D projection orientation can improve the sensitivity of the B1 measurement. The projection data illustrated in FIGS. 6B to 6E correspond to different projection orientations (605, 610, 615, and 620) of the B1 map in FIG. 6A and of the greyscale B1 map of FIG. 6F. Each of the horizontal axes of FIGS. 6B to 6E corresponds to 128 spatial positions along their respective projection orientations (605, 610, 615, and 620) and, as illustrated, were measured with FOV=45 cm. The projection orientation 610 with B1 projection data illustrated in FIG. 6C is the preferred orientation for the first sub-set because it is able to observe the region of low B1 amplitude (e.g., on the anterior left thigh). The dip in the projection data of FIG. 6C between the solid and hollow circles corresponds to the average B1 amplitude values obtained from approximately between the solid and hollow circles of FIGS. 6A and 6F where those average values are obtained orthogonally to the projection orientation. The same projection data from orientation 610 may also be used to identify the second sub-set of the high B1 amplitude region. Alternatively, a second projection orientation may be selected for the identification of the second sub-set of B1 data. However, in this example, the single orientation of 610 suffices for identifying the first sub-set and the second sub-set. The other projection orientations (605, 615, and 620 illustrated in FIGS. 6B, 6D, and 6E, respectively) demonstrate how the low and high B1 regions are mostly unobservable due to the averaging of the B1 amplitude along the projected dimension orthogonal to the line. Furthermore, as can be seen from FIGS. 6B-6E, an air threshold may be selected as 0.6 in at least one embodiment.

While the above discussions have been made with respect to performing an analysis on all the (non-air) B1 amplitude values on a particular 1D projection, a sub-portion of any 1D projection may be used instead. For example, a single projection may include plural drops in B1 values (called "holes"), and calculations which do not distinguish between the plural holes will combine values from the plural holes during processing (e.g., when determining the lowest X % of the non-air values). While some imaging areas may be processed using information from both holes, in an alternate embodiment, only the Z % of lowest values within the hole having the deeper hole is used.

In yet another embodiment, the processing described herein can limit the B1 amplitude data to a particular region in a two-dimensional slice or in three-dimensional volume. For example, the processing can determine a smallest (non-air) value with the dataset as a whole and then select only those values that are within a specified distance (in two or three dimensions) of the lowest value to be used in the calculation of the new RFL. Similarly, a region-growing technique can be used on the two-dimensional slice or three-dimensional volume to determine all the values within a threshold amount that correspond to the hole that has the most low-value data values contiguously connected.

As discussed above with respect to steps 330 and 335 of FIG. 3, the MRI apparatus 1 obtains at least two sets of MRI image data (e.g., one using the first RF parameter (e.g., RFL1 corresponding to $NewRFL_{high\ region}$ discussed above) and one using the second RFL parameter (e.g., RFL2 corresponding to $NewRFL_{low\ region}$ discussed above)) and uses them to produce a corrected image. As will be discussed in greater detail below, in alternate embodiments, the RFL1 and RFL2 values may be determined by methods other than using determined extreme values. For example, RFL1 and RFL2 may be obtained from a database of RFL values that are either constant for all imaging procedures or are varying based on run-time parameters such as the type of region being imaged (e.g., thigh, prostate, skull, and pelvis), the type of imaging to be performed on the region, and/or patient-specific parameters (e.g., a weight of a patient that may affect the size/location of the region being imaged with respect to a center of an imaging area). In yet another embodiment, the RFL1 and RFL2 values are manually selected and entered by a user. In fact, in general, the system can use any two values as long as RFL1 and RFL2 are not the same value. Either of the values can be greater than or equal or less than or equal to the RFL that provides an average B1 value of 1.0. In at least one embodiment, the values are selected without performing a prescan.

Figure 7A:
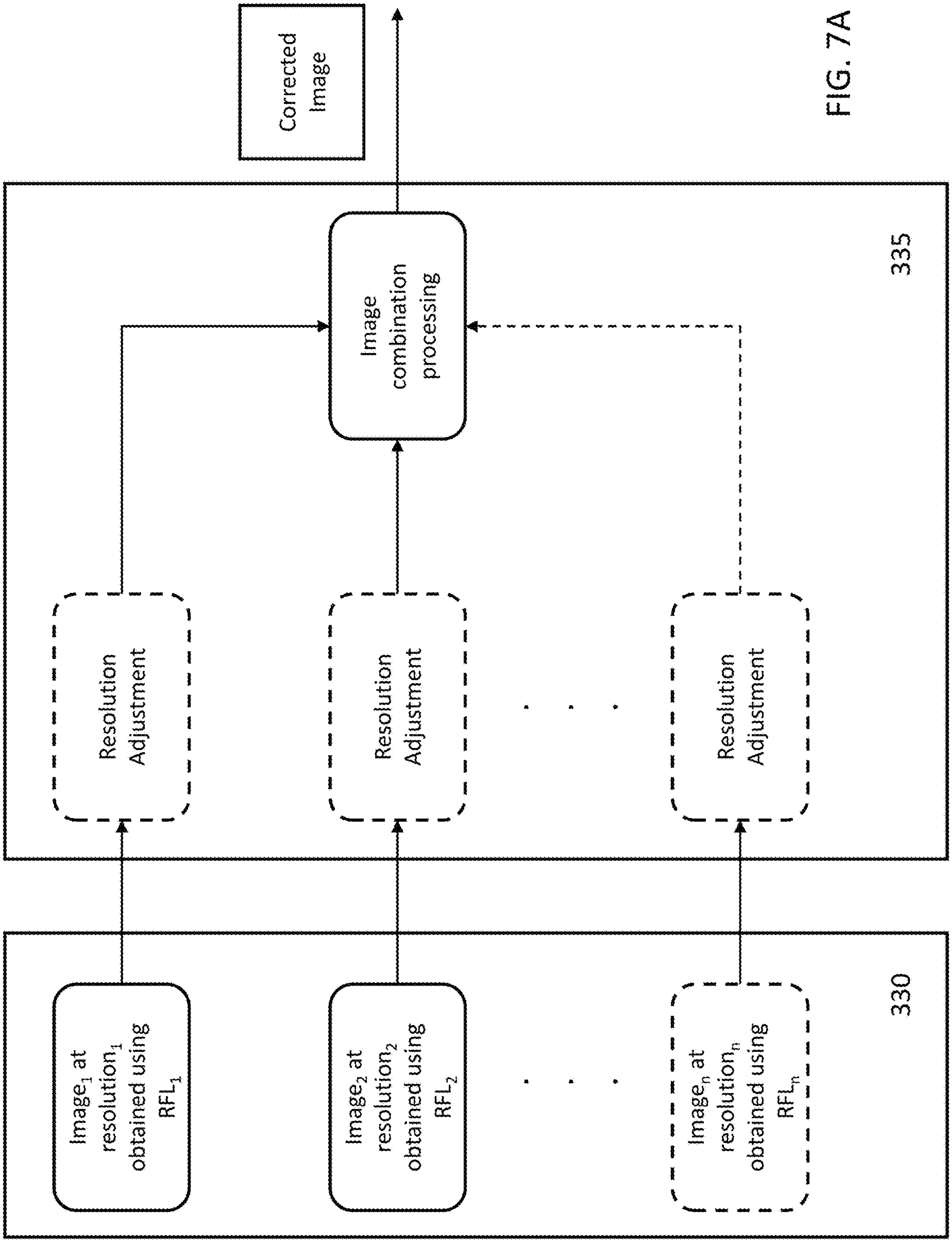
FIG. 7A is a data flow diagram showing exemplary data flows corresponding to steps 330 and 335 of FIG. 3 to produce a corrected image according to a first embodiment.

As shown in the dataflow diagram of FIG. 7A, the first set of image data (referred to generally as $Image_1$) is obtained using RFL1, and the second set of image data (referred to generally as $Image_2$) is obtained using RFL2. In a first embodiment, $Image_1$ and $Image_2$ are obtained at a same resolution (as shown in FIGS. 8B and 8C), and they are combined to produce a corrected image using Maximum Intensity Projection (MIP) on a pixel-by-pixel basis across the entirety of the corrected image. Other image compositing functions also can be used, such as the average (mean, median, or mode) of pixel values. Moreover, more than two sets of image data can be obtained each using its own respective, different transmit RF parameter(s), and each of the sets of image data can be used in the calculation of the corrected image.

Figure 8A:
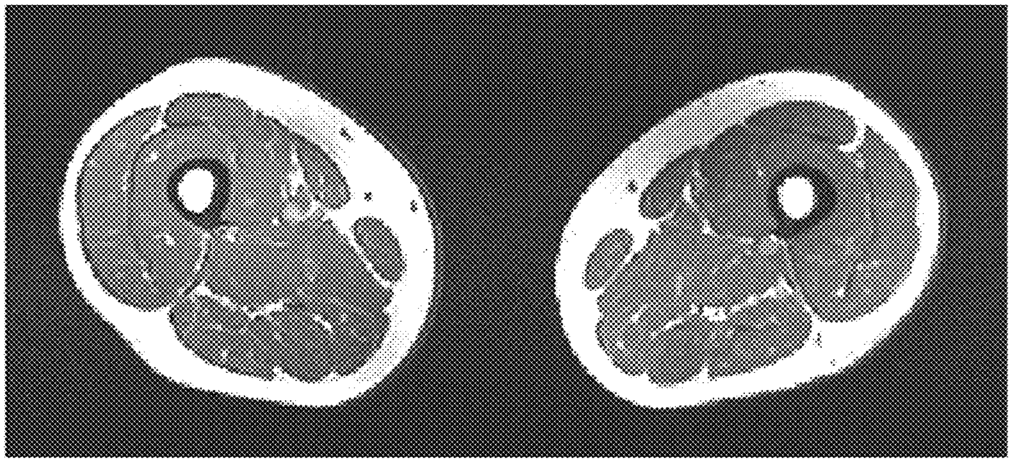
FIG. 8A is a corrected image (as compared to FIG. 4B) produced by a first method of combining plural images of the same resolution but obtained at differing RFLs.
Figure 8B:
FIG. 8B and FIG. 8C are original images (taken at different RFLs compared to FIG. 4B) used to produce the corrected image of FIG. 8A.
Figure 8C:
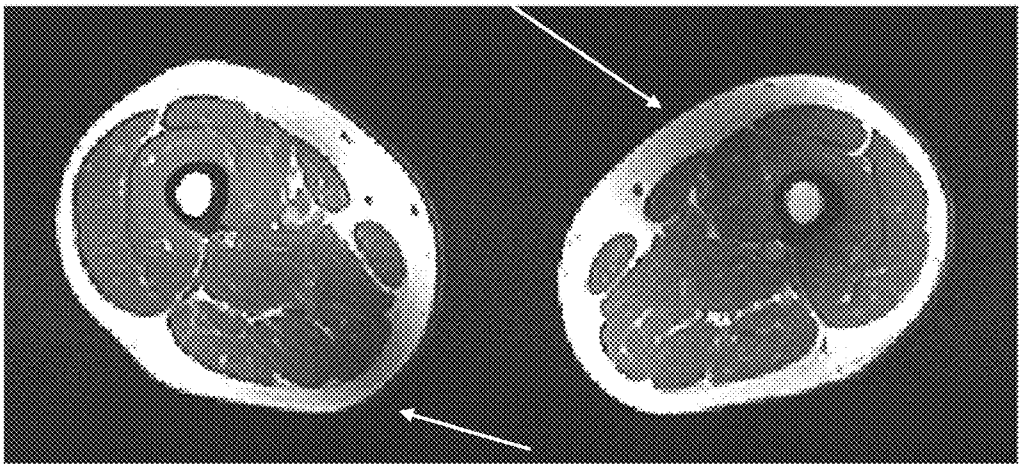

As shown in FIG. 8A, the corrected image has at least one area of reduced darkness as compared with the areas of darkness in the original images (highlighted by the white arrows). While the exemplary original images represent two images both taken at full sampling acquisition, the images may be obtained using differing acquisition processes (e.g., full sampling or accelerated acquisitions). For example, $Image_2$ may be accelerated using Sensitivity Encoding (SENSE), Generalized Autocalibrating Partial Parallel Acquisition (GRAPPA), Array coil Spatial Sensitivity Encoding (ARC), Compressed Sensing (CS), or Machine Learning Reconstruction (MLR). For example, $Image_2$ may be acquired with an acceleration factor of 2 or 3. Image may also be accelerated with the same or a different acceleration method and acceleration factor as $Image_2$.

Figure 7B:
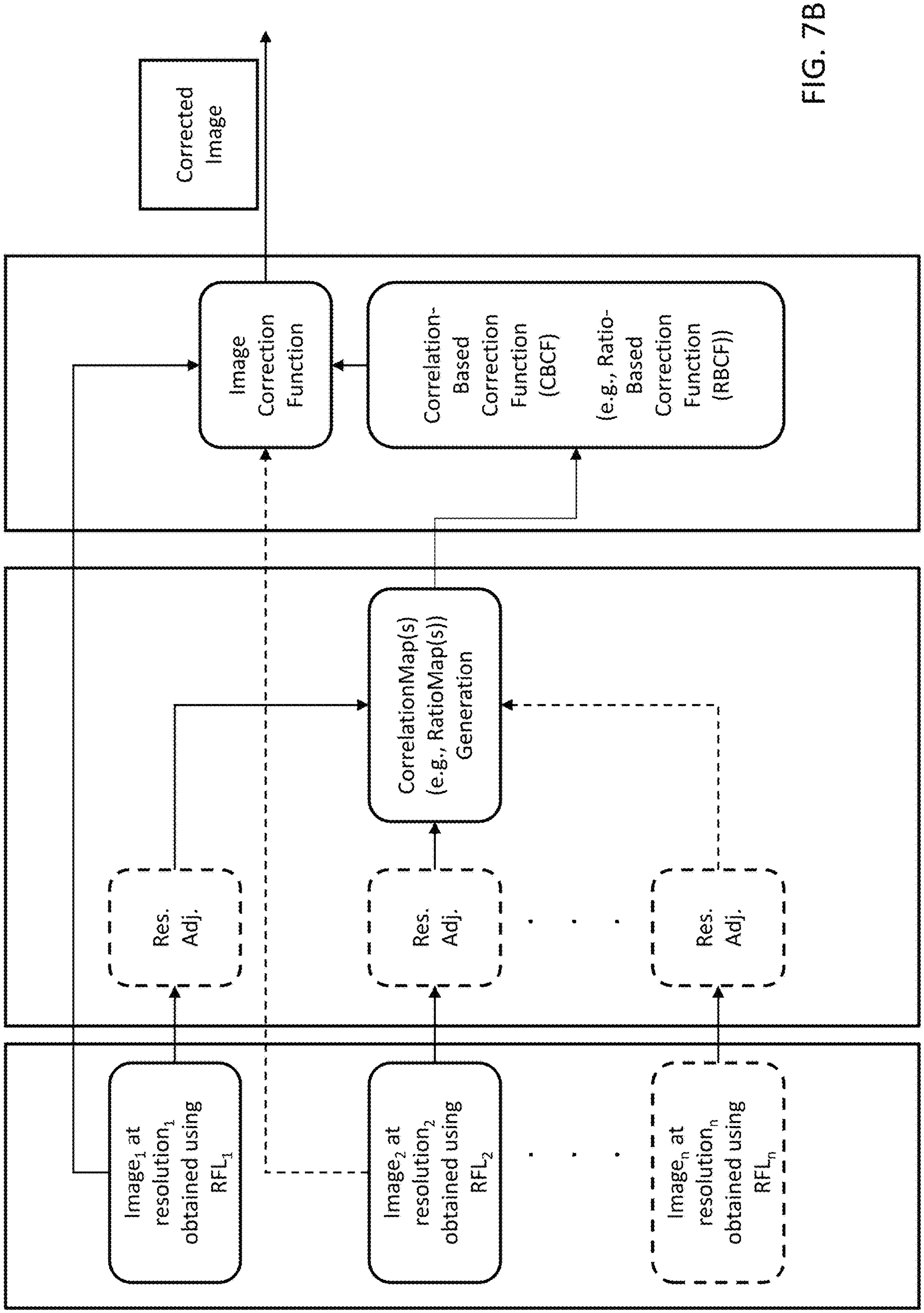
FIG. 7B is a data flow diagram showing exemplary data flows to produce a corrected image according to a second embodiment.
Figure 9A:
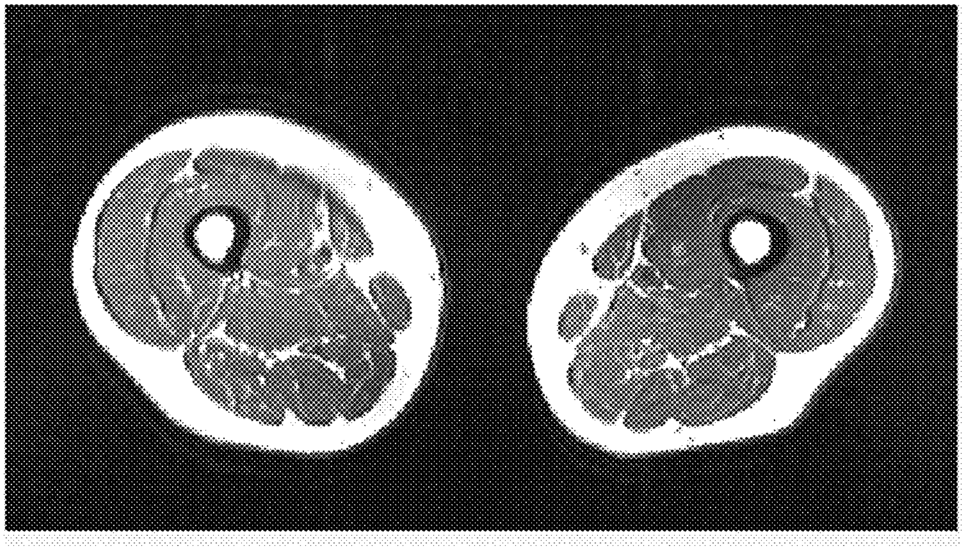
FIG. 9A is a corrected image (as compared to FIG. 4B) produced by a second method of combining plural images where the plural images were obtained at differing RFLs and differing resolutions.
Figure 9B:
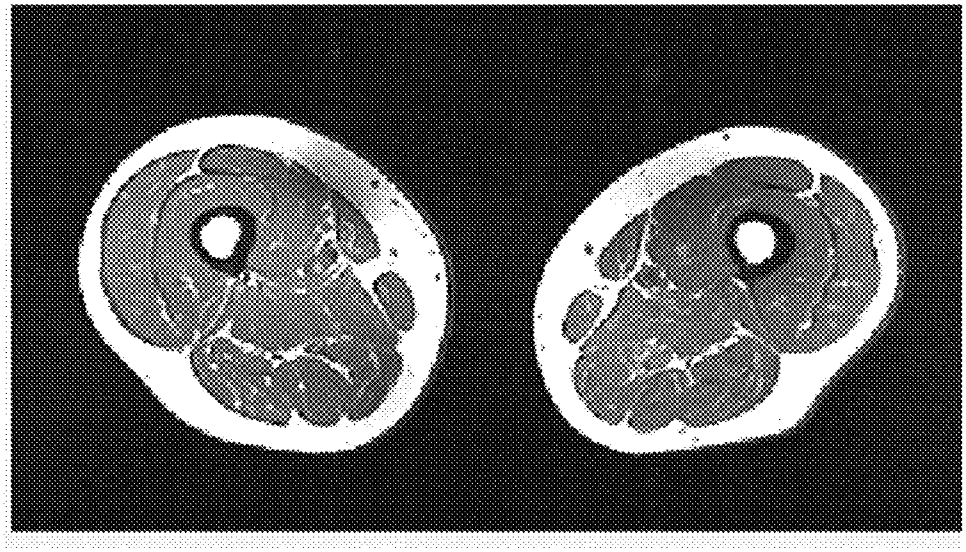
FIG. 9B and FIG. 9C are first and second original images, respectively, used to produce the corrected image of FIG. 9A where the first and second original images were obtained at differing RFLs and higher and lower resolutions, respectively as compared to FIG. 4B.
Figure 9C:
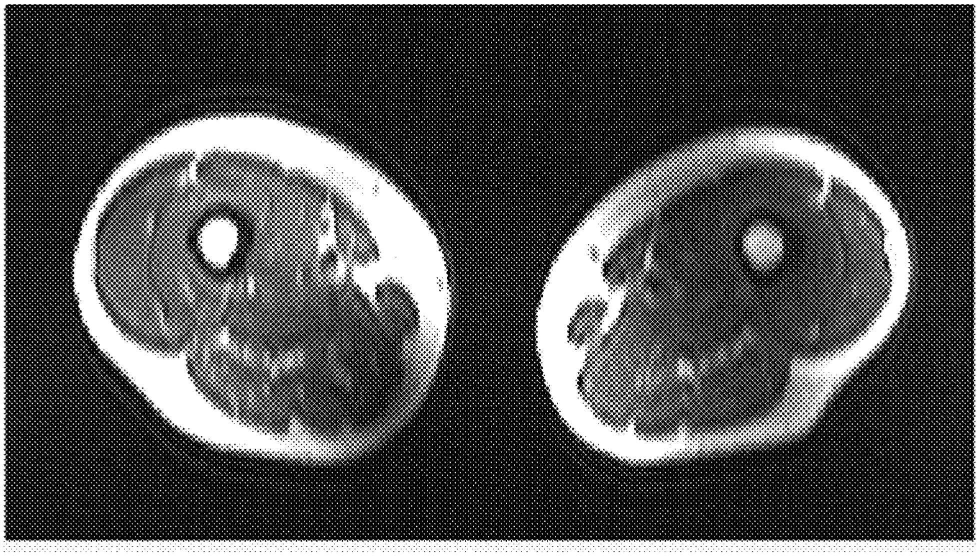

In alternate embodiments, $Image_1$ and $Image_2$ are not obtained at a same resolution. Instead, as shown in FIGS. 9B and 9C, $Image_1$ and $Image_2$ are obtained higher and lower resolutions, respectively. For example, the resolution of $Image_2$ may be lower than $Image_1$ (i.e., the spatial voxels used to generate $Image_2$ are larger than those used to generate $Image_1$). The use of larger voxels reduces the additional scan time to obtaining a second image. However, because the lower-resolution image is blurrier than the higher-resolution image, a MIP combination of the two images results in a blurry image, as shown in FIG. 9A. To help address the blurriness issues, at least one of the images preferably undergoes a resolution adjustment before performing the image combination as shown in FIGS. 7A and 7B.

Figure 10A:
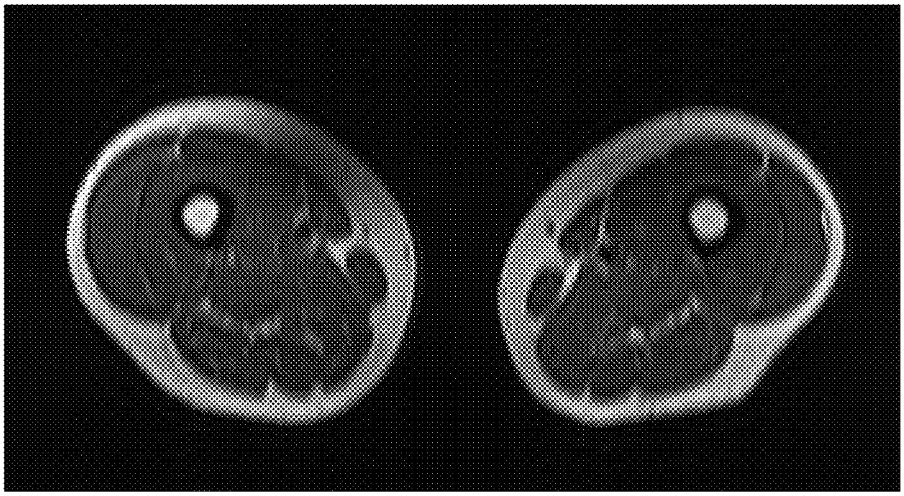
FIG. 10A is a downsampled version of a full-resolution image obtained using a first RFL different than the RFL of FIG. 4B.

In one such embodiment, a lower-resolution version of $Image_1$ (as shown in FIG. 10A) (referred to as $Image_{1(lowres)}$) is generated (e.g., by performing k-space data truncation on the original image data of $Image_1$). Then, on a pixel-by-pixel basis for all pixels (x,y) using $Image_{1(lowres)}$ (FIG. 10A) and $Image_2$ (FIG. 10B) (which also can be referred to as $Image_{2(lowres)}$ for clarity), a ratio map is calculated according to:

$$RatioMap(x, y) = \begin{cases} \frac{Image_{2(lowres)}(x, y)}{Image_{1(lowres)}(x, y)} & \text{if } \left(\frac{Image_{2(lowres)}(x, y)}{Image_{1(lowres)}(x, y)}\right) \geq 1.0 \\ 1.0 & \text{otherwise} \end{cases} . \quad \text{(Eq. 7)}$$

Figure 10B:
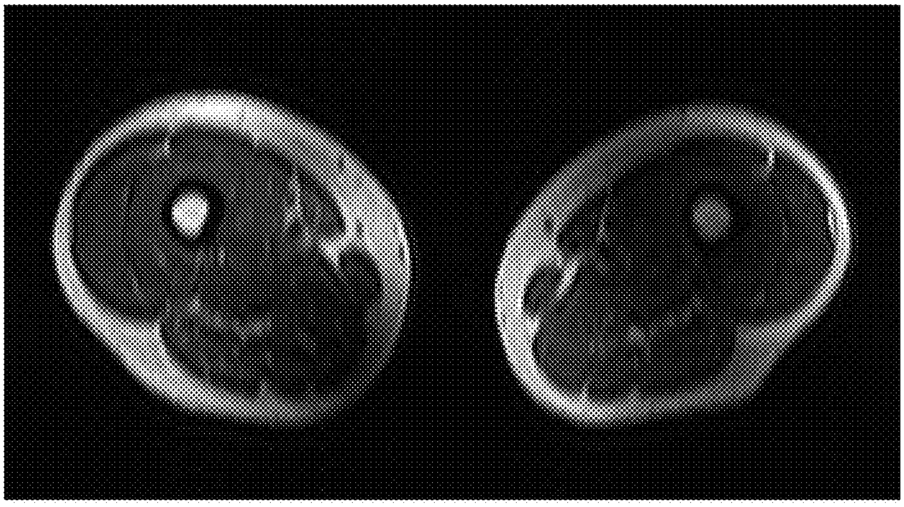
FIG. 10B is a lower-resolution image obtained using a second RFL different than the RFL of FIG. 4B.
Figure 10C:
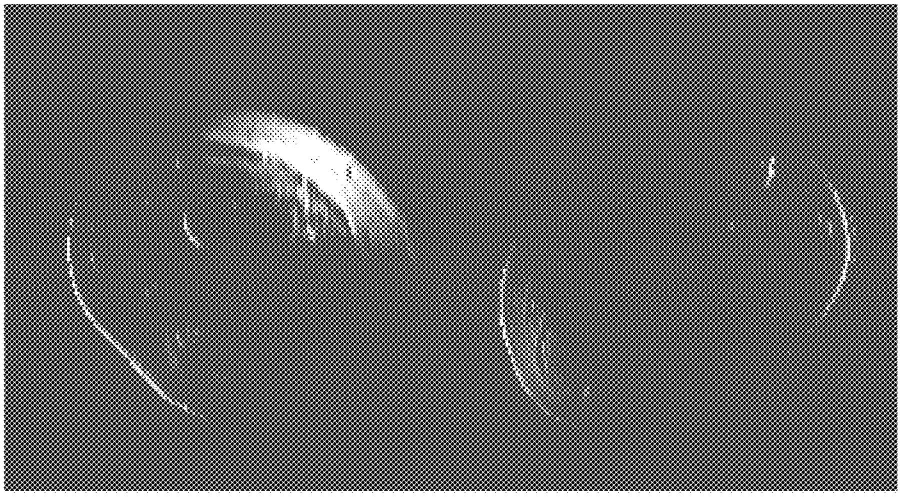
FIG. 10C is a RatioMap of the images of FIGS. 10B and 10A, respectively.

(Other threshold values other than 1.0 can be used in the calculation of a RatioMap.) An image representation of the ratio map generated from FIG. 10A and FIG. 10B is illustrated in FIG. 10C. Other non-linear combination of $Image_{1(lowres)}$ and $Image_{2(lowres)}$ are possible that avoid including contributions where $Image_{2(lowres)}$ (x,y) $<Image_{1(lowres)}$ (x,y). Using the RatioMap (x,y), the corrected image can be generated according to:

$$Image_{corrected}(x, y) = Image_1 * RBCF(\text{RatioMap}(x, y)). \quad \text{(Eq. 8)}$$

A data flow diagram showing the above-discussed image correction technique is shown in FIG. 7B, and in one embodiment, the Ratio-Based Correction Function (RBCF) is simply a unity gain (a multiplication by 1.0).

In yet another embodiment using different imaging resolutions, rather than producing $Image_{1(lowres)}$ (i.e., a low-resolution version of $Image_1$) from $Image_1$, to combine with $Image_{2(lowres)}$, an approximated higher-resolution version of $Image_2$ is created using at least one trained neural network. In a first of such embodiments, a first neural network is trained by receiving as an input low-resolution versions of images and as a target output high-resolution versions of the same input low-resolution images. Once trained, the low-resolution $Image_2$ would be "upsampled" by the first neural network and applied to the same kind of image combining processing as was discussed above with respect to combining two full-resolution images.

In a second embodiment using different imaging resolutions, a second neural network is trained to perform a combination of upsampling and image compositing. In such an embodiment, the inputs to train the second neural network are a full-resolution image using $NewRFL_{low\ range}$ and a low-resolution image using $NewRFL_{high\ range}$, and the target outputs to train the second neural network are a MIP combination of full-resolution versions of the images obtained using $NewRFL_{low\ range}$ and $NewRFL_{high\ range}$. Once trained, the second neural network would directly produce the corrected image from a full-resolution image using $NewRFL_{low\ range}$ and a low-resolution image using $NewRFL_{high\ range}$.

As shown in FIGS. 7A and 7B, additional embodiments utilize more than two images (e.g., 3 or more images) in the image correction process. The images can be either all full-resolution images or can be at least one higher-resolution image combined with at least one lower-resolution image. In an embodiment using three images, the three images would be acquired using NewRFL values calculated to bring a particular region close to a target B1 value (e.g., 1.0). By using more sets of image data, image quality can be improved because each image will have higher (better) signal in its targeted region.

In one such three image embodiment, one full-resolution image is obtained using RFL1, and two lower-resolution images are obtained using RFL2 and RFL3. RFL2 and RFL3 are chosen such that (1) RFL2<RFL1, and RFL2 has good tip in regions where RFL1 has overtip and (2) RFL3>RFL1 and RFL3 has good tip in regions where RFL1 has undertip. Corresponding RatioMaps are created for (RFL2/RFL1) and (RFL3/RFL1) as described above where the ratio is always at least 1.0. The images can then be composited together to produce a corrected image by either (1) Corrected=(RFL1*Ratio2+RFL1*Ratio3)/2 or (2) Corrected=MIP [RFL1*Ratio2; RFL1*Ratio3].

Just as with the neural network implementations described above for two images, a neural network can be trained to produce a corrected image from three (or more) images where at least one image is a full-resolution image and at least one image is a lower-resolution image.

Figure 11A:
FIG. 11A is a color amplitude map of a human pelvis.
Figure 11B:
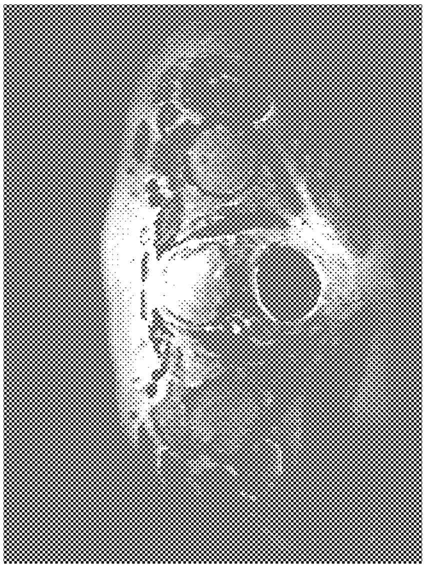
FIG. 11B is an exemplary RatioMap of the human pelvis of FIG. 11A.
Figure 11C:
FIG. 11C is an image of the human pelvis obtained by using an RFL such that an average B1 level of the resulting image is a target level of 1.0.
Figure 11D:
FIG. 11D is a corrected image obtained by a method described herein.
Figure 11E:
FIGS. 11E and 11F are images of the human pelvis obtained by using an RFL such that an average B1 level of the resulting image is 0.8 and 1.40 times a target level of 1.0, respectively.
Figure 11F:
Figure 11G:
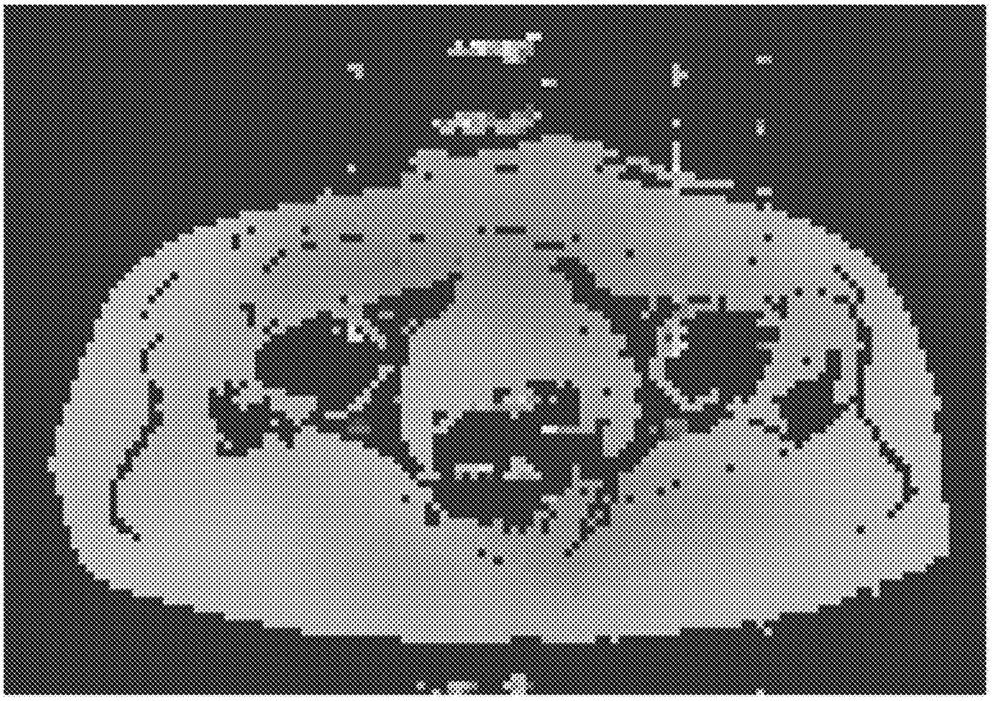
FIG. 11G is a greyscale amplitude map corresponding to the color amplitude map of FIG. 11A.
Figure 11H:
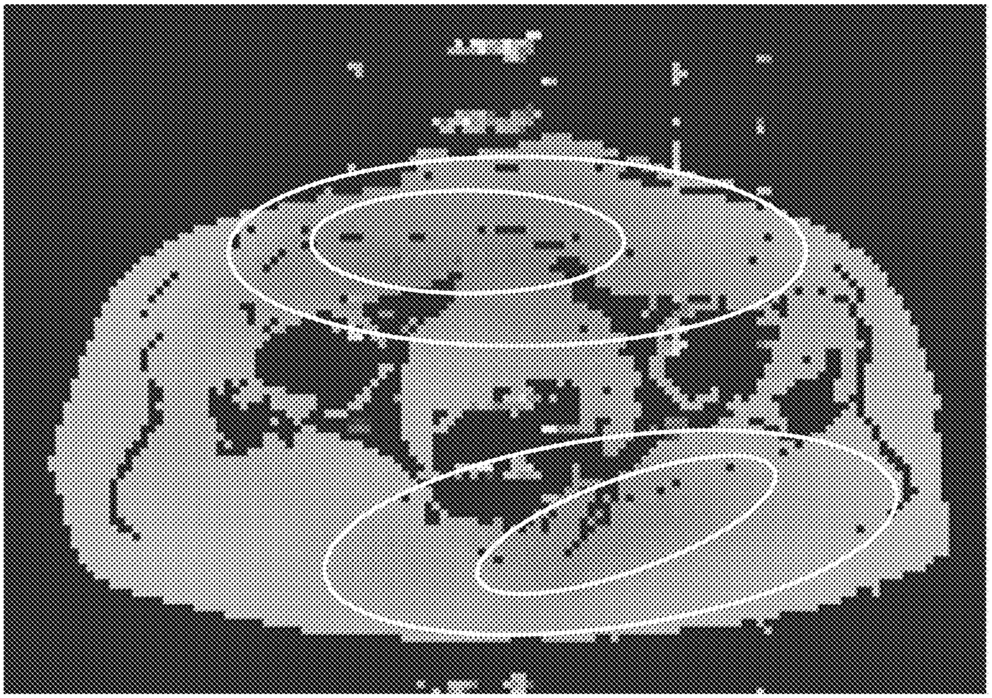
FIG. 11H is an annotated version of the greyscale amplitude map of FIG. 11G.

FIG. 11A is a color B1 amplitude map of a human pelvis. FIG. 11B is a ratio map illustrating the ratios (greater than one) of the pixels of FIGS. 11F to 11E when RFL2 (of FIG. 11F) is 1.4 and RFL1 (of FIG. 11E) is 0.80. As can be seen in FIG. 11D, the corrected pelvic image has more uniform brightness as compared to a convention image of FIG. 11C where the image has an average B1 value of the target B1 value. FIG. 11G is a greyscale version of the color B1 amplitude map of FIG. 11A. In FIG. 11H, the greyscale version of the B1 amplitude map has been annotated like the annotated B1 map of FIG. 4J where the outer white ovals correspond to the green regions having B1 values of approximately 80% of the target B1, and the inner white ovals correspond to the blue regions having B1 values of approximately 60% of the target B1. In FIG. 11H, the amplitude values decrease towards the center of the inner ovals and increase going away from the center of the inner ovals.

As discussed above with respect to FIG. 3, a series of MRI sequences are performed with at least two transmit RF parameters to acquire at least two sets of image data. RFL1 and RFL2 may be obtained from a database of RFL values that are either constant for all imaging procedures or are varying based on run-time parameters such as the type of region being imaged (e.g., thigh, prostate, skull, and pelvis), the type of imaging to be performed on the region, and/or patient-specific parameters (e.g., a weight of a patient that may affect the size/location of the region being imaged with respect to a center of an imaging area). In yet another embodiment, the RFL1 and RFL2 values are manually selected and entered by a user. In fact, in general, the system can use any two values as long as RFL1 and RFL2 are not the same value. Either of the values can be greater than or equal or less than or equal to the RFL that provides an average B1 value of 1.0. In at least one embodiment, the values are selected without performing a prescan. As discussed above, the two sets of image data need not be at the same resolution.

As discussed above, a ratio-map may be computed from the acquired at least two sets of image data as described above with respect to Eq. 7 and used to correct an image using a ratio-based correction function (RBCF) as discussed with respect to Eq. 8. As shown in FIG. 7B, the ratio-map may be either the same resolution as one or more of the sets of image data or may be of a lower resolution. As an alternative to the unity gain ratio-based correction function (RBCF) discussed above, an exponential correction factor (ECF) (e.g., 1.5) can be used for the RBCF instead according to:

$$\mathrm{Image}_{corrected}(x, y) = \mathrm{Image}_1 * \left(\mathrm{RatioMap}(x, y)^{ECF}\right). \quad \text{(Eq. 9)}$$

More generally, a CorrelationMap produces a pixel-by-pixel correlation of two images obtained using different RF parameters, and a RatioMap is one embodiment of such a CorrelationMap. Having calculated a CorrelationMap, an image is then corrected using a correlation-based correction function (CBCF) (such as an RBCF). CorrelationMaps can be calculated by a number of different functions, including, but not limited to, (a) a difference of two images and (b) a difference obtained by subtracting a logarithm of each image.

Figure 12:
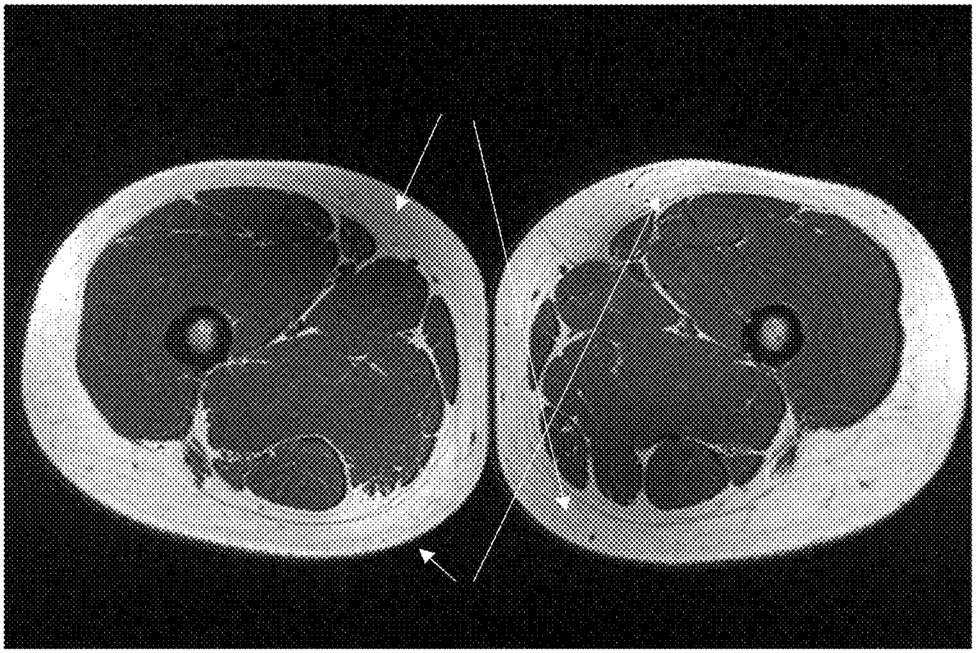
FIG. 12 is an image of a pair of legs corrected using a first ratio-based correction function.

FIG. 12 is an image of a pair of legs corrected using the ratio-based correction function of Eq. 9 with an ECF value of 1.5. As can be seen therein, such a configuration can address the effects of undertipping and overtipping in some portions of the image. While image quality is improved, overcorrection may still occur (as highlighted by the upward facing arrows), and under-correction may still occur (as highlighted by the downward facing arrows). Other functions that those based on a unity gain or an exponential correction factor also are possible.

Figure 13:
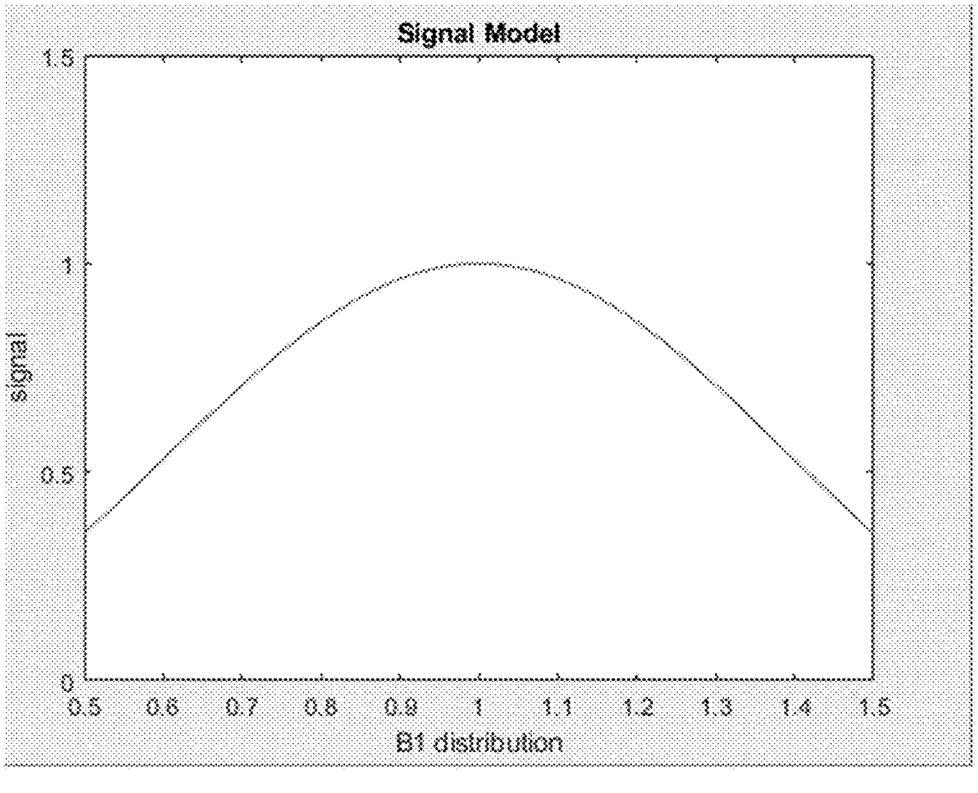
FIG. 13 is a graph illustrating a relationship between B1 values and an obtained signal for use in a fast spin echo environment at a first RFL.

While Eq. 9 provides a first ratio-based correction function, alternate correction functions are possible. Another such correction function is based on a signal model based on the physics-based relationship between B1 and an image signal. One such relationship, shown in FIG. 13, utilizes a model of excitation (flip angle=0) and refocus (flip angle=20) pulses to describe a spin echo or fast spin echo signal according to the equation: signal=$\sin^3(B1*\theta)$) when the RFL is chosen to have an average B1 field of 1.0. Other embodiments can be used to model other types of pulse sequences, such a field echo by using signal=sin $(B1*\theta)$. Other effects (e.g., T1 relaxation effects) can be included in the model as well.

Figure 14A:
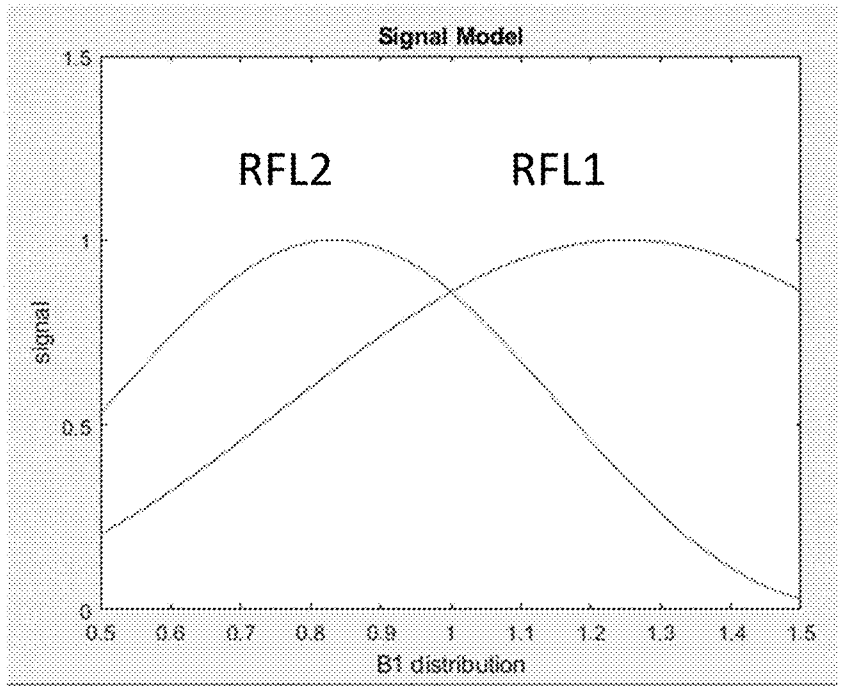
FIG. 14A is a graph illustrating a relationship between B1 values and an obtained signal for use in a fast spin echo environment at second and third RFLs.
Figure 14B:
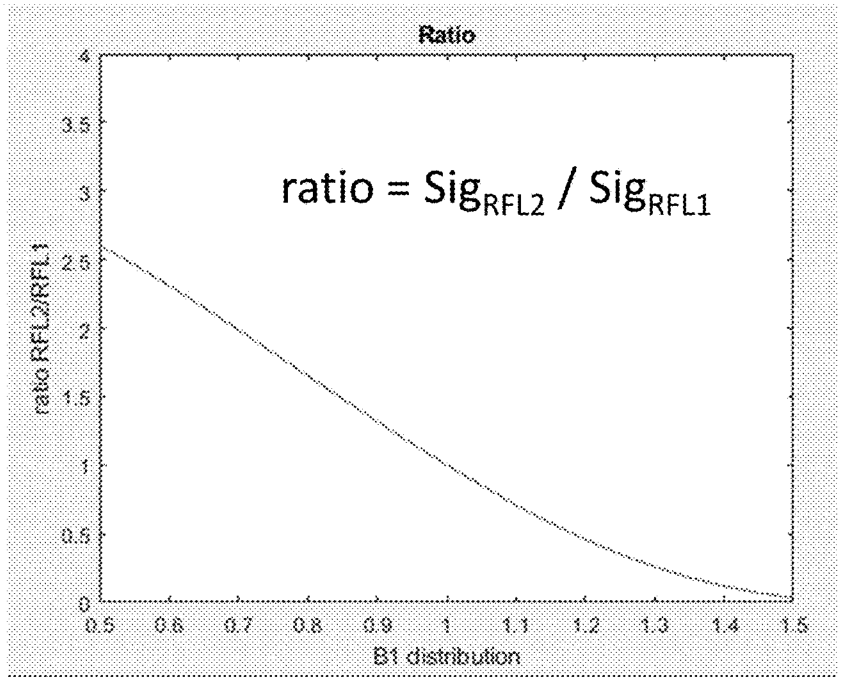
FIG. 14B is a graph illustrating a ratio of the curves of FIG. 14A.
Figure 14C:
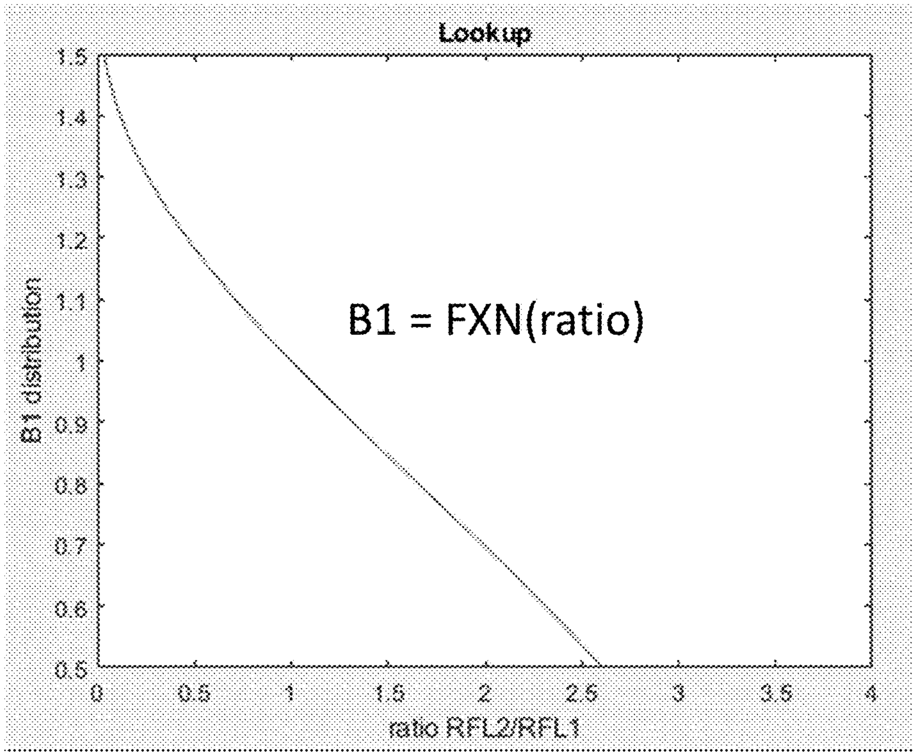
FIG. 14C is a graph illustrating a relationship between estimated B1 value and the ratio curve of FIG. 14B.
Figure 14D:
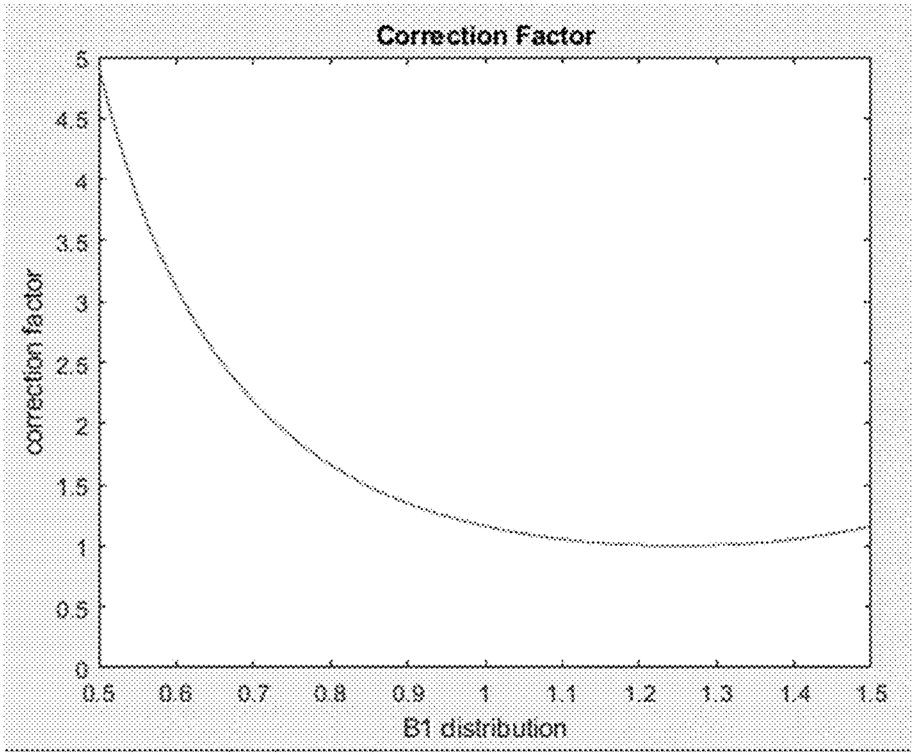
FIG. 14D is a graph illustrating a correction function to be applied to an image based on the estimated B1 value obtained by applying the ratio of FIG. 14C.

By modeling the effects on B1 by differing RFLs (RFL1 and RFL2), separate curves representing the resulting B1 distributions can be obtained, as shown in FIG. 14A. From the two B1 distributions of FIG. 14A, a ratio can be calculated across the range of B1 distributions. as shown in FIG. 14B. The transpose of that ratio, shown in FIG. 14C then can be used as ratio-to-B1 mapping function (e.g., implemented as a lookup table (e.g., stored in memory 41)) to determine what the estimated value of B1 is at any particular pixel based on the ratio of the values obtained at the at least two RFL (i.e., RFL1 and RFL2). A ratio-based correction function (RBCF) can then be calculated by applying the ratio-to-B1 mapping function to the reciprocal of the B1 signal model (of FIG. 14A). As a result, FIG. 14D illustrates a ratio-based correction function (RBCF) that can be used in the system of FIG. 7B to correct the set of image data for RFL1 on a pixel-by-pixel basis by multiplying the pixel values in the first set of image data (corresponding to RFL1) by the ratio-based correction function having taken the ratio map from the first and second sets of image data. That is, by applying the calculated ratio map to a ratio-based correction function modeling an inverse of a B1 model representing how the first and second sets of image data were obtained, the corrections needed to correct at least the first set of image data are produced. As shown in FIG. 7B, additional RatioMaps can be calculated, and multiple ratio-based correction functions can be used to correct different parts of one or more images to create a corrected image. Such a configuration may be beneficial in images using ultrahigh B0 fields (e.g., greater than 3T).

Figure 15A:
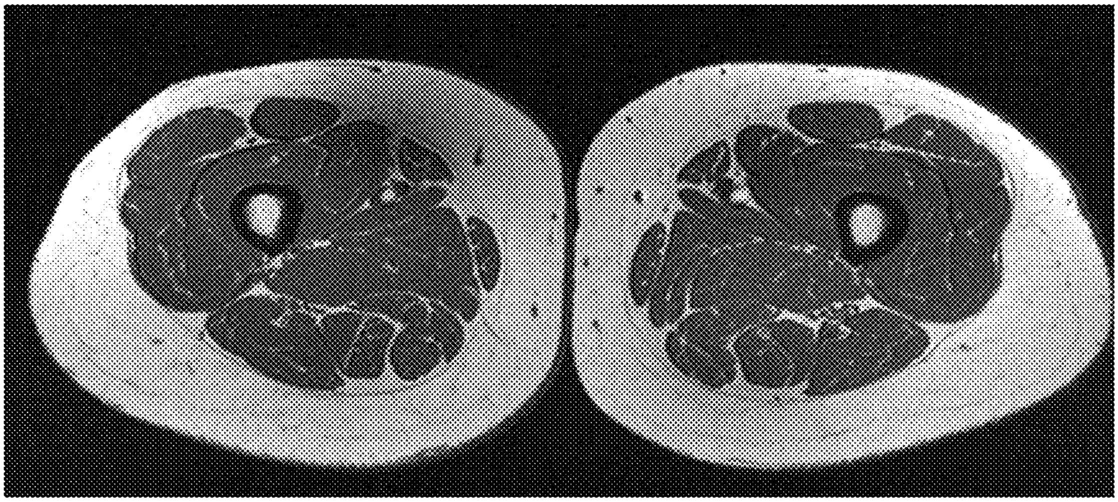
FIG. 15A is an original uncorrected image of a pair of human thighs.
Figure 15B:
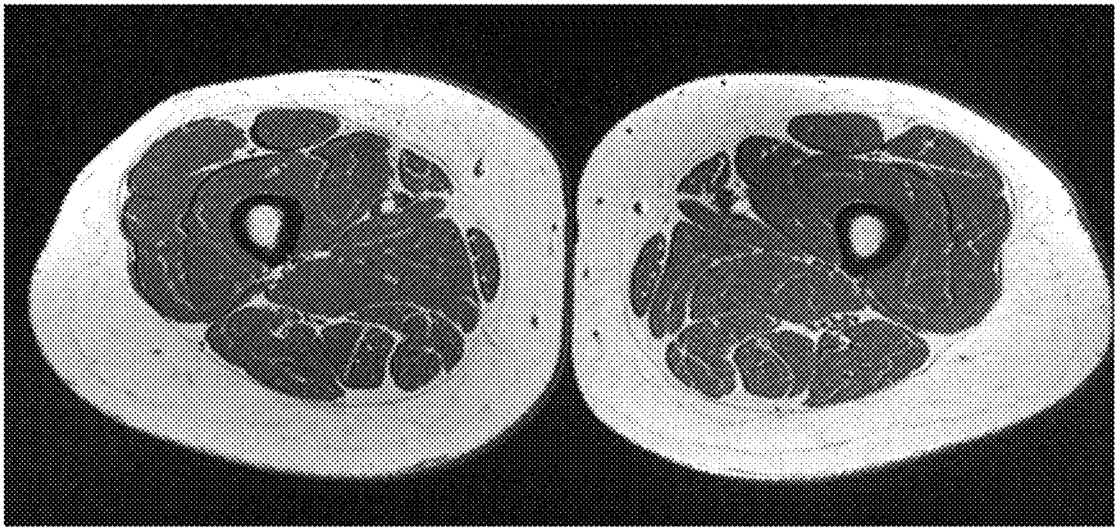
FIG. 15B is a corrected image based on the image of FIG. 15A using a ratio-based correction function described herein.
Figure 16A:
FIG. 16A is an original uncorrected image of a human pelvis.
Figure 16B:
FIG. 16B is a corrected image based on the image of FIG. 16A using a ratio-based correction function described herein.

FIG. 15A illustrates an original uncorrected image of a pair of human thighs. By applying a ratio-based correction function on pixel-by-pixel basis (based on the ratio map of Eq. 7 obtained for the image), a corrected image can be obtained as shown in FIG. 15B. As shown therein, the darkened areas that resulted from undertipping in the original image were lightened and made more consistent with the other portions of the image without adding overtipping. Similarly, FIG. 16A illustrates an original uncorrected image of a human pelvis. By applying a ratio-based correction function on pixel-by-pixel basis (based on the ratio map of Eq. 7 obtained for the image), a corrected image can be obtained as shown in FIG. 16B. As shown therein, the darkened areas that resulted from undertipping in the original image were lightened and made more consistent with the other portions of the image without adding overtipping.

In addition to the other configurations and methods described herein, other configurations and methods are set forth in the not limiting parentheticals set forth below. Those include, but are not limited to:

(1) An image processing method including, but not limited to: obtaining first and second sets of image data generated by performing a series of MRI sequences using first and second different transmit RF parameters; calculating a correlation map from the first and second sets of image data; and correcting the first set of image data using the calculated correlation map to obtain a corrected image.

(2) The method according to (1), wherein: calculating the correlation map from the first and second sets of image data comprises calculating a ratio map from the first and second sets of image data; and correcting the first set of image data using the calculated correlation map comprises correcting the first set of image data using the calculated ratio map to obtain the corrected image.

(3) The method according to (2), wherein correcting the first set of image data using the calculated ratio map includes, but is not limited to, correcting the first set of image data using the calculated ratio map raised to an exponential correction function.

(4) The method according to any one of (1)-(3), wherein the first and second different transmit RF parameters are first and second different RF transmitter gain levels.

(5) The method according to any one of (1)-(3), further including, but not limited to: obtaining spatially-resolved B1 amplitude measurements; and selecting the first and second different transmit RF parameters by performing at least two spatially-resolved analyses on the obtained spatially-resolved B1 amplitude measurements.

(6) The method according to (4), wherein performing the at least two spatially-resolved analyses includes, but is not limited to, using a histogram to obtain first and second sub-sets of spatially-resolved B1 amplitude measurements, and wherein selecting the first and second different transmit RF parameters includes, but is not limited to, selecting the first transmit RF parameter by using the first sub-set of spatially-resolved B1 amplitude measurements and selecting the second transmit RF parameter by using the second sub-set of spatially-resolved B1 amplitude measurements.

(7) The method according to (6), wherein using the histogram to obtain first and second sub-sets of spatially-resolved B1 amplitude measurements includes, but is not limited to, using the histogram (a) to obtain as the first sub-set of spatially-resolved B1 amplitude measurements a lowest first percentage of the spatially-resolved B1 amplitude measurements and (b) to obtain as the second sub-set of spatially-resolved B1 amplitude measurements a highest second percentage of the spatially-resolved B1 amplitude measurements.

(8) The method according to (5), wherein obtaining the spatially-resolved B1 amplitude measurements includes, but is not limited to, at least one of: using a Bloch-Siegert shift sequence to obtain the spatially-resolved B1 amplitude measurements and using Actual Flip Angle imaging to obtain the spatially-resolved B1 amplitude measurements.

(9) The method according to any one of (5)-(8), wherein obtaining the spatially-resolved B1 amplitude measurements includes, but is not limited to, obtaining a 1D projection.

(10) The method according to any one of (5)-(8), wherein obtaining the spatially-resolved B1 amplitude measurements includes, but is not limited to, obtaining a 2D slice.

(11) The method according to any one of (5)-(8), wherein obtaining the spatially-resolved B1 amplitude measurements includes, but is not limited to, obtaining a 3D volume.

(12) The method according to (1), wherein correcting the first set of image data using the calculated correlation map includes, but is not limited to, correcting the first set of image data by applying the calculated correlation map to a correlation-based correction function modeling an inverse of a B1 model representing how the first and second sets of image data were obtained.

(13) The method according to any one of (1)-(12), wherein correcting the first set of image data using the calculated correlation map includes, but is not limited to, correcting the first set of image data using the calculated correlation map when the calculated correlation map is larger than a threshold value.

(14) The method according to any one of (1)-(13), wherein obtaining first and second sets of image data includes, but is not limited to, obtaining the first set of image data at a first resolution and obtaining the second set of image data at a second resolution different than the first resolution; and wherein calculating the correlation map from the first and second sets of image data includes, but is not limited to, calculating the correlation map at a lower resolution of the first and second resolution.

(15) The method according to claim 14), wherein correcting the first set of image data using the calculated correlation map includes, but is not limited to, correcting the first set of image data using a neural network receiving the correlation map calculated at the lower resolution.

(16) A transmit RF parameter determination method including, but not limited to: obtaining spatially-resolved B1 amplitude measurements; performing at least two spatially-resolved analyses on the obtained spatially-resolved B1 amplitude measurements to obtain at least two sub-sets of spatially-resolved B1 amplitude measurements; determining at least two transmit RF parameters to be used in a series of MRI sequences based on the obtained at least two sub-sets of spatially-resolved B1 amplitude measurements; and storing the at least two transmit RF parameters.

(17) The method according to (16), further including, but not limited to, performing the series of MRI sequences with the at least two transmit RF parameters.

(18) The method according to any one of (16) or (17), wherein the at least two transmit RF parameters are different RF transmitter gain levels.

(19) The method according to any one of (16)-(18), wherein performing the at least two spatially-resolved analyses includes, but is not limited to, using a histogram to obtain first and second sub-sets of spatially-resolved B1 amplitude measurements, and wherein selecting the first and second different transmit RF parameters includes, but is not limited to, selecting the first transmit RF parameter by using the first sub-set of spatially-resolved B1 amplitude measurements and selecting the second transmit RF parameter by using the second sub-set of spatially-resolved B1 amplitude measurements.

(20) The method according to (19), wherein using the histogram to obtain first and second sub-sets of spatially-resolved B1 amplitude measurements includes, but is not limited to, using the histogram (a) to obtain as the first sub-set of spatially-resolved B1 amplitude measurements a lowest first percentage of the spatially-resolved B1 amplitude measurements and (b) to obtain as the second sub-set of spatially-resolved B1 amplitude measurements a highest second percentage of the spatially-resolved B1 amplitude measurements.

(21) The method according to any one of (16)-(20), wherein obtaining the spatially-resolved B1 amplitude measurements includes, but is not limited to, using a Bloch-Siegert shift sequence to obtain the spatially-resolved B1 amplitude measurements.

(22) The method according to any one of (16)-(20), wherein obtaining the spatially-resolved B1 amplitude measurements includes, but is not limited to, using Actual Flip Angle imaging to obtain the spatially-resolved B1 amplitude measurements.

(23) The method according to any one of (16)-(22), wherein obtaining the spatially-resolved B1 amplitude measurements includes, but is not limited to, obtaining a 1D projection.

(24) The method according to any one of (16)-(22), wherein obtaining the spatially-resolved B1 amplitude measurements includes, but is not limited to, obtaining a 2D slice.

(25) The method according to any one of (16)-(22), wherein obtaining the spatially-resolved B1 amplitude measurements includes, but is not limited to, obtaining a 3D volume.

(26) A Magnetic Resonance Imaging (MRI) system including, but not limited to: a gantry; at least one RF transmitter coil; and an RF transmitter coil controller configured to perform the steps of any one of (1)-(25).

(27) A computer program product including, but not limited to:

a non-transitory computer readable storage medium configured to be communicatively coupled to a computer processor, wherein the non-transitory computer readable storage medium includes computer instructions which, when executed by the computer processor, cause the computer processor to perform the steps of any one of (1)-(25).

While certain implementations have been described, these implementations have been presented by way of example only, and are not intended to limit the teachings of this disclosure. Indeed, the novel methods, apparatuses and systems described herein can be embodied in a variety of other forms; furthermore, various omissions, substitutions and changes in the form of the methods, apparatuses and systems described herein can be made without departing from the spirit of this disclosure.

The invention claimed is:

1. An image processing method comprising:

obtaining spatially-resolved B1 amplitude measurements; and selecting first and second different transmit RF parameters by performing at least two spatially-resolved analyses on the obtained spatially-resolved B1 amplitude measurements;

obtaining first and second sets of image data generated by performing a series of MRI sequences using the first and second different transmit RF parameters;

calculating a correlation map from the first and second sets of image data; and correcting the first set of image data using the calculated correlation map to obtain a corrected image, wherein the first and second different transmit RF parameters are selected from the group consisting of: first and second different RF levels, first and second different RF transmitter gain levels, first and second different RF phases, and first and second different RF shim settings.

2. The method according to claim 1, wherein:

calculating the correlation map from the first and second sets of image data comprises calculating a ratio map from the first and second sets of image data; and correcting the first set of image data using the calculated correlation map comprises correcting the first set of image data using the calculated ratio map to obtain the corrected image.

3. The method according to claim 2, wherein correcting the first set of image data using the calculated ratio map comprises correcting the first set of image data using the calculated ratio map raised to an exponential correction function.

4. The method according to claim 1, wherein the first and second different transmit RF parameters are the first and second different RF transmitter gain levels.

5. The method according to claim 1, wherein performing the at least two spatially-resolved analyses comprises using a histogram to obtain first and second sub-sets of spatially-resolved B1 amplitude measurements, and wherein selecting the first and second different transmit RF parameters comprises selecting the first transmit RF parameter by using the first sub-set of spatially-resolved B1 amplitude measurements and selecting the second transmit RF parameter by using the second sub-set of spatially-resolved B1 amplitude measurements.

6. The method according to claim 5, wherein using the histogram to obtain first and second sub-sets of spatially-resolved B1 amplitude measurements comprises using the histogram (a) to obtain as the first sub-set of spatially-resolved B1 amplitude measurements a lowest first percentage of the spatially-resolved B1 amplitude measurements and (b) to obtain as the second sub-set of spatially-resolved B1 amplitude measurements a highest second percentage of the spatially-resolved B1 amplitude measurements.

7. The method according to claim 1, wherein obtaining the spatially-resolved B1 amplitude measurements comprises at least one of using a Bloch-Siegert shift sequence to obtain the spatially-resolved B1 amplitude measurements and using Actual Flip Angle imaging to obtain the spatially-resolved B1 amplitude measurements.

8. The method according to claim 1, wherein obtaining the spatially-resolved B1 amplitude measurements comprises obtaining a 1D projection.

9. The method according to claim 1, wherein obtaining the spatially-resolved B1 amplitude measurements comprises obtaining a 2D slice.

10. The method according to claim 1, wherein obtaining the spatially-resolved B1 amplitude measurements comprises obtaining a 3D volume.

11. The method according to claim 1, wherein correcting the first set of image data using the calculated correlation map comprises correcting the first set of image data by applying the calculated correlation map to a correlation-based correction function modeling an inverse of a B1 model representing how the first and second sets of image data were obtained.

12. The method according to claim 1, wherein correcting the first set of image data using the calculated correlation map comprises correcting the first set of image data using the calculated correlation map when the calculated correlation map is larger than a threshold value.

13. The method according to claim 1, wherein obtaining first and second sets of image data comprises obtaining the first set of image data at a first resolution and obtaining the second set of image data at a second resolution different than the first resolution; and wherein calculating the correlation map from the first and second sets of image data comprises calculating the correlation map at a lower resolution of the first and second resolution.

14. The method according to claim 13, wherein correcting the first set of image data using the calculated correlation map comprises correcting the first set of image data using a neural network receiving the correlation map calculated at the lower resolution.

15. The method according to claim 1, wherein the first and second different transmit RF parameters are the first and second different RF shim settings.

16. A Magnetic Resonance Imaging (MRI) system comprising:

a gantry;

at least one RF transmitter coil; and

RF transmitter coil controller circuitry configured to:

obtain spatially-resolved B1 amplitude measurements; and select first and second different transmit RF parameters by performing at least two spatially-resolved analyses on the obtained spatially-resolved B1 amplitude measurements;

obtain first and second sets of image data generated by performing a series of MRI sequences using the first and second different transmit RF parameters;

calculate a correlation map from the first and second sets of image data; and correct the first set of image data using the calculated correlation map to obtain a corrected image, wherein the first and second different transmit RF parameters are selected from the group consisting of: first and second different RF levels, first and second different RF transmitter gain levels, first and second different RF phases, and first and second different RF shim settings.

17. The MRI system according to claim 16, wherein the first and second different transmit RF parameters are the first and second different RF transmitter gain levels.

18. A computer program product comprising:

a non-transitory computer readable storage medium configured to be communicatively coupled to a computer processor, wherein the non-transitory computer readable storage medium includes computer instructions which, when executed by the computer processor, cause the computer processor to perform the steps of:

obtaining spatially-resolved B1 amplitude measurements; and selecting first and second different transmit RF parameters by performing at least two spatially-resolved analyses on the obtained spatially-resolved B1 amplitude measurements;

obtaining first and second sets of image data generated by performing a series of MRI sequences using the first and second different transmit RF parameters;

calculating a correlation map from the first and second sets of image data; and correcting the first set of image data using the calculated correlation map to obtain a corrected image, wherein the first and second different transmit RF parameters are selected from the group consisting of: first and second different RF levels, first and second different RF transmitter gain levels, first and second different RF phases, and first and second different RF shim settings.

19. The computer program product according to claim 18, wherein the first and second different transmit RF parameters are the first and second different RF transmitter gain levels.

* * * * *